US005166693A

United States Patent [19]

Nishikawa et al.

[11] Patent Number: 5,166,693

[45] Date of Patent: Nov. 24, 1992

[54] MOBILE ANTENNA SYSTEM

[75] Inventors: Kunitoshi Nishikawa, Nagoya; Kazuo Sato, Aichi; Tomoaki Hirako, Nagoya; Mitoshi Fujimoto, Aichi, all of Japan

[73] Assignee: Kabushiki Kaisha Toyota Chuo Kenkyusho, Aichi, Japan

[21] Appl. No.: 629,653

[22] Filed: Dec. 7, 1990

[30] Foreign Application Priority Data

| | | | |
|---|---|---|---|
| Dec. 11, 1989 | [JP] | Japan | 1-321744 |
| Dec. 29, 1989 | [JP] | Japan | 1-343187 |
| Dec. 29, 1989 | [JP] | Japan | 1-343189 |

[51] Int. Cl.[5] ........................ G01S 5/02; H04B 7/185; H01Q 3/00

[52] U.S. Cl. .................................... 342/422; 342/354; 342/359; 343/700 MS

[58] Field of Search ................. 342/422, 75, 354, 357, 342/359; 343/700 MS

[56] References Cited

U.S. PATENT DOCUMENTS

| | | | |
|---|---|---|---|
| 4,725,843 | 2/1988 | Suzuki et al. | 342/359 |
| 4,841,303 | 6/1989 | Anderson . | |
| 4,866,451 | 9/1989 | Chen . | |
| 4,965,605 | 10/1990 | Chang et al. | 343/700 MS |
| 5,005,019 | 4/1991 | Zaghloul et al. | 343/700 MS |

FOREIGN PATENT DOCUMENTS 112325 7/1938 Australia .

OTHER PUBLICATIONS

Huang: "L-Band Phased Array Antennas For Mobile Satellite Communications" 37th IEEE Vehicular Technology Conf., Jun. 1987 pp. 113-117.

Schmidt: "Low Cost Microstrip Phased Array Antenna For Use in Mobile Satellite Telephone Communication Service": 1987 Int'l Symp. Digest Ant. and Prop. vol. II, Jun. 1987.

Derneryd et al "Multi-Layered Microstrop Array Antenna" 18th European Microwave Conf. Sep. 1988 pp. 1049-1054.

37th IEEE Vehicular Technology Conference, Jun. 1987, Tampa. Fla., pp. 113-117, Huang: "L-Band Phased Array Antennas for Mobile Satellite Communications".

1987 International Symposium Digest Antennas and Propagation, vol. II, Jun. 1987, Blacksburg, Va., pp. 1152-1155, Schmidt: "Low-Cost Microstrip Phased Array Antenna for Use in Mobile Satellite Telephone Communication Service".

18th European Microwave Conference, Sep. 1988, Stockholm, Sweden, pp. 1049-1054, Derneryd et al, "Multi-Layer Microstrip Array Antenna".

1987 IEEE, pp. 113-117, J. Huang, "L-Band Phased Array Antennas for Mobile Satellite Communications".

*Primary Examiner*—Gregory C. Issing

*Attorney, Agent, or Firm*—Oblon, Spivak, McClelland, Maier & Neustadt

[57] ABSTRACT

In mobile communications, it is required that the beam direction is maintained to track the desired direction as the mobile is moving. For such a purpose, the mobile includes an angular rate sensor mounted therein which detects the state of turn in the mobile and to control the beam direction of the antenna in accordance with the state of turn as well as the strength of radiowave received by a receiver in the mobile. Antenna elements are in the form of microstrip antenna and are arranged in plane on the same dielectric substrate. Feeding and drive circuit layers for controlling the transmission and reception at the antenna elements are stacked into a single layered unit. This enables the antenna system to be formed into a low-profile structure. The dielectric substrate of the microstrip antenna element is formed by stacking a plurality of dielectric substrate different in dielectric constant from one another. It is thus intended that the band width of the antenna is increased and that the mutual coupling between the antenna elements is reduced to prevent the gain of the antenna from being lowered. Furthermore, the position of feed points in the antenna element are rotated against each adjacent antenna element. This can improve the axial ratio in the array antenna over a wide band width.

12 Claims, 24 Drawing Sheets

MOBILE ANTENNA SYSTEM

BACKGROUND OF THE INVENTION

1. Field of the Invention

The present invention relates to an antenna system for use in mobiles such as motorcars and other vehicles and particularly to such an antenna system that is suitable for tracking dependent upon the moving direction of the mobile.

2. Description of the Prior Art

With rapid progress of electronic communication techniques, radiowave communication has been popular in various fields. Particularly, with miniaturization of electronic instruments such as transmitter-receivers and others, the spotlight of attention is now focused upon mobile communication using a land mobile telephone or the like.

There is known a cellular mobile telephone system which includes a plurality of ground base stations. Each of the base stations controls the communication link between the base station and mobiles within one area. This system has been adopted in land mobile telephones and the like. However, such a communication system utilizing the ground base stations can only be used in the limited area since the number of base stations cannot infinitely be increased.

Another mobile communication system is also known which utilizes a communication satellite. The mobile satellite communication system is being studied into practical use in various applications since it does not have the aforementioned limitation as in the mobile communication utilizing the ground base stations and can do high-quality services over a wide area of a nation-wide scale.

In the latter case, an antenna to be mounted on the mobile becomes one of very important factors. If the antenna cannot operate well on transmission and reception, a transmitter receiver and associated electronic components cannot function well even though they are very high in performance.

As a mobile such as a motorcar or other vehicle is moving, the direction of the satellite will vary every moment. Therefore, the beam direction of an antenna mounted on the mobile must be pointed to the satellite by use of any suitable tracking means.

A step track method is popular as tracking methods. The step track method is adapted to maintain the beam direction to the satellite by slightly moving the direction of the antenna at a suitable time interval so that the beam of antenna is pointed in the direction of a received signal.

In such mobiles as ships and aircrafts which do not vary in direction very well and in which the blocking effect by any obstruction does not rise, the step track method is satisfactory on tracking the satellite.

However, land mobiles are frequently steered and turned with higher speeds than those of the ships and aircrafts and radiowave from the satellite may be blocked by any obstruction such as building or the like. Therefore, it is frequent that the step track method is not satisfactory in tracking. Once a radiowave is blocked by a utility pole or building, the mobile may miss the satellite completely.

Even if radiowaves are being stably received by the mobile, the strength of received signal may vary more than necessary since the beam direction of the antenna is always changed slightly every moment to search the maximum strength of received signal.

The antenna must be as small and thin as possible since it should be mounted on the mobile. And also, the antenna must provide a low air resistance when the mobile is running.

Mechanically steered antenna cannot be miniaturize since it includes a mechanical drive.

A phased array antenna is known which can be electronically steered. Such a phased array antenna is suitable for use in radar system and mobile satellite communication. It is however difficult to miniaturize the entire phased array antenna because it requires feeding circuits including phase shifters, power dividers feeding and others; control circuits for the phase shifters; and so on, in order to control the atenna beam.

One of small antennas is a microstrip antenna which may be utilized as an antenna element in an array antenna. However, the microstrip antenna has a disadvantage that it has a narrow band width. In order to overcome such a problem, there is considered a stacked microstrip antenna to which a passive element is added to increase the band width. To obtain the band width of 8%, the stacked microstrip antenna requires its height equal to about 0.075 wavelength. When the central frequency is 1600 MHz, it is required that the height of the antenna is about 14 mm. This is too high for the intended purpose. As the antenna element is higher, the mutual coupling is increased. As the result, it cannot perform its function sufficiently in the gain and the axial ratio.

SUMMARY OF THE INVENTION

It is therefore an object of the present invention to provide an antenna system which has the following features:

(1) The beam of an antenna can be properly controlled depending on the orientation of a moving mobile.

(2) The thickness of the antenna structure is so small that it can easily be mounted in the mobile.

(3) The mutual coupling between antenna elements is so small that it can sufficiently function as an array antenna.

(4) The good axial ratio is obtained throughout the wide frequency range.

To this end, the present invention provides a mobile antenna system which comprises a phased array antenna having an antenna elements layer, a feeding network layer and a drive circuit layer, all of which are stacked one above another, said antenna elements layer including a plurality of radiating patch elements on a dielectric substrate, said feeding network layer including a feeding network consisting of phase shifters and power dividers each of which is made with microstrip-line and connected to the respective one of said radiating patches, and said drive circuit layer including drive circuits for controlling the phase in each of the phase shifters; an angular rate sensor for detecting the turning direction of a mobile; a receiver for detecting the strength of received signals; and beam control means responsive to the results of detection in the angular rate sensor and the receiver for controlling the beam direction of said antenna, whereby the beam of the array antenna can be steered by controlling the phase of each of said antenna elements depending on the orientation of the moving mobile.

In one aspect of the present invention, the feeding network including the phase shifters and power dividers and the drive circuit are arranged in the same face of the substrate which is in turn stacked together with flat antenna elements, permitting the entire thickness of the antenna to be very thin in comparison with the conventional phased array antennas.

The on-vehicle tracking system of the present invention has such a construction as described above. The phase relative to each of the antenna elements in the array antenna is controlled by a phase control section such that a differential phase between each adjacent antenna elements will be set at a predetermined value. Thus, the pattern of the array antenna can be controlled according to the antenna element spacing and the differential phase.

Such an array antenna is called "phased array antenna". This will be briefly described below.

There is now considered herein, for example, an array antenna which comprises a plurality of antenna elements $A_1$ to $A_n$ equal to n in number, these elements being arranged in line at a space interval d, as shown in FIG. 34. It is also assumed that all the antenna elements $A_1-A_n$ are isotropically radiating elements. It is further presumed that an angle included between the array antenna arrangement and a normal line (angle of incidence) is $\theta$ and that a plane wave reaches when the angle $\theta$ is equal to $\theta_o$.

Assuming that the leftmost element $A_1$ as viewed in FIG. 34 is a reference element, the phase of a wave reaching each of the antenna elements $A_2-A_n$ will advance by $\Delta\phi$ for each antenna element from the starting element $A_2$ to the ending element $A_n$. Thus, $\Delta\phi$ is represented by:

$$\Delta\phi=2\pi(d/\gamma)\cdot\sin\theta_o$$

where $\gamma$ is the wavelength of the incidental plane wave.

If the phase in each of the antenna elements $A_2-A_n$ is delayed by $\Delta\phi$ by the phase shifters $B_2-B_n$ and thereafter they are combined together by a power combiner C, high frequency signals can be taken out in phase from the respective antenna elements $A_1-A_n$. Therefore, the beam of the array antenna will be able to be scanned in any direction $\theta$.

On transmission, the radiated power is focused in any direction $\theta$ in the similar manner. If the antenna elements A are arranged two-dimensionally, the beam of the array antenna can be scanned in three dimensions.

The present invention is to control the beam of the antenna depending on the results of detection of the orientation of the mobile during turning and the received signal level from the receiver. When the mobile moves straight, the beam direction of the antenna will not be varied. Thus, the variations of received signal level can be effectively suppressed. On turning, the beam direction of the antenna is controlled to track the satellite well, depending on the results of detection in the angular rate sensor and the received signal. When the radiowave is blocked by any obstruction on ground, the tracking can be effectively continued by using the angular rate sensor.

It will be apparent from the foregoing that the mobile antenna system according to the present invention can perform the tracking very well since tracking can be controlled depending on the state of the moving mobile. Furthermore, the mobile antenna system can effectively deal with any change of motion of the mobile since the present invention utilizes the phased array antenna having the beam which can electronically be controlled.

Since the phased array antenna section comprises the antennas, feeding networks and drive circuits which are layered one above another, it can be formed into a thinned structure which can be easily mounted on a small land mobile.

Microstrip antenna used as antenna elements in the array antenna comprises a ground plane, a driver patch element disposed on a dielectric substrate opposite to the ground plane and a parasitic driven patch element arranged and spaced apart from the driver patch element, the dielectric substrate being formed into a stack of two or more dielectric substrates having different dielectric constants.

Thus, the microstrip antenna is characterized in that it is formed into a dielectric substrate located between the driver patch element and the ground plane, the dielectric substrate being formed by a stack of two or more dielectric materials having different dielectric constants.

In order to reduce mutual coupling between antenna elements, it is required that the spacing between the driven patch element and the ground plane is decreased. On the other hand, if it is wanted to widen the band width, the spacing between the driven patch element and the ground plane must be increased. However, the matching to the impedance of the feed line cannot be taken only by satisfying such conditions. Therefore, the band width with low VSWR does not become wide enough.

The inventors have studied such a problem in various types of experiments to research the condition required to take the matching. It has been thus found that the band width of the antenna to be matched to the feed line is changed by varying the relative dielectric constant $\epsilon_r$ between the driver patch and the ground plane into the value $\epsilon_{rmax}$ which can provide the maximum band width, as shown in FIG. 35.

If the relative dielectric constant is set to the value of $\epsilon_{rmax}$, the wide frequency band width can be provided as shown by solid line in FIG. 22. If the resulting value $\epsilon_{rmax}$ is equal to the value of $\epsilon_r$ of a dielectric easily available (which, for example, is equal to 2.6 for Teflon; 3.6 for a dielectric material comprising bis(maleimide)-triazine resin and glass fabric; and 4.6 for glass epoxy), such a dielectric material can be used to realize a wide band antenna element.

It is frequent that the easily available dielectric does not have its relative dielectric constant equal to the value $\epsilon_{rmax}$.

In accordance with the present invention, thus, the microstrip antenna can have any specific inductive capacity $\epsilon_r$ substantially equal to the value of $\epsilon_{rmax}$ by stacking a plurality of conventional dielectric materials different in dielectric constant from one to another into a suitable thickness.

For example, if a dielectric substrate is formed by stacking three dielectric layers having a thickness $t_1$, $t_2$ and $t_3$ and relative dielectric constants $\epsilon_{r1}$, $\epsilon_{r2}$ and $\epsilon_{r3}$ respectively this substrate will have the entire value of relative dielectric constant $\epsilon_r$ represented by:

$$\epsilon_r=(t_1+t_1+t_1)/(t_1/\epsilon_{r1}+t_2/\epsilon_{r2}+t_3/\epsilon_{r3}).$$

the required value $\epsilon_r$ can be equal to $\epsilon_{rmax}$. In accordance with the present invention, the substrate of the driver patch element can have a widened range of the dielectric constant by stacking two or more dielectric substrates different in relative dielectric constant from one to another and also properly adjusting the thickness of each substrate.

In such a manner, the microstrip antenna can have a frequency band width which is increased up to about 8%. At the same time, the spacing between the driven and driver patch elements can be reduced in comparison with the prior art. Thus, if such microstrip antennas are used as antenna elements in the array antenna, the mutual coupling between the antenna element spacing can be reduced and simultaneously the array antenna itself can be miniaturized with higher function.

In accordance with the present invention, further, the array antenna is characterized in that each of the antenna elements has two feed points having different angles of 90° relative to the center and that said array antenna further comprises feed means for supplying powers with 90° phase difference to the two feed points of the antenna element to excite the circular polarization. said antenna elements being arranged into a triangle fashion and being rotated by 120° or feed positions different from each other by 90°.

In general, it is very difficult that only one of antennas has a good axial ratio throughout the wide frequency band.

An antenna is thus considered herein which has a polarization in the form of an ellipsoid as shown in FIG. 32. It has been found that if two such antennas are arranged perpendicular to each other, that is, if the feed points are arranged angularly rotated in relation to one another by 90° to compensate for the strength together, a good axial ratio can be obtained as shown by the broken line in FIG. 33. It has been also confirmed that a good axial ratio is provided over a wide band width.

The axial ratio is further improved if the positions of the feed points are equally distributed in all the directions. It has been further confirmed that the location of each adjacent antenna feed points at different positions reduces mutual coupling between antenna elements.

If the feed points in each adjacent antenna elements in an array are differently positioned, the axial ratio in the entire array antenna can be improved throughout a wide frequency band. Even if each of the antenna elements has a different feed position, the antenna elements can be corrected out of phase at different feed positions to provide a predetermined phase to each of the antenna elements.

The present invention can provide a new and improved array antenna comprising a plurality of antenna elements having different feed point positions, which can improve its axial ratio and effectively perform the transmission and reception over the wide frequency band.

DETAILED DESCRIPTION OF PREFERRED EMBODIMENTS

Figure 1:
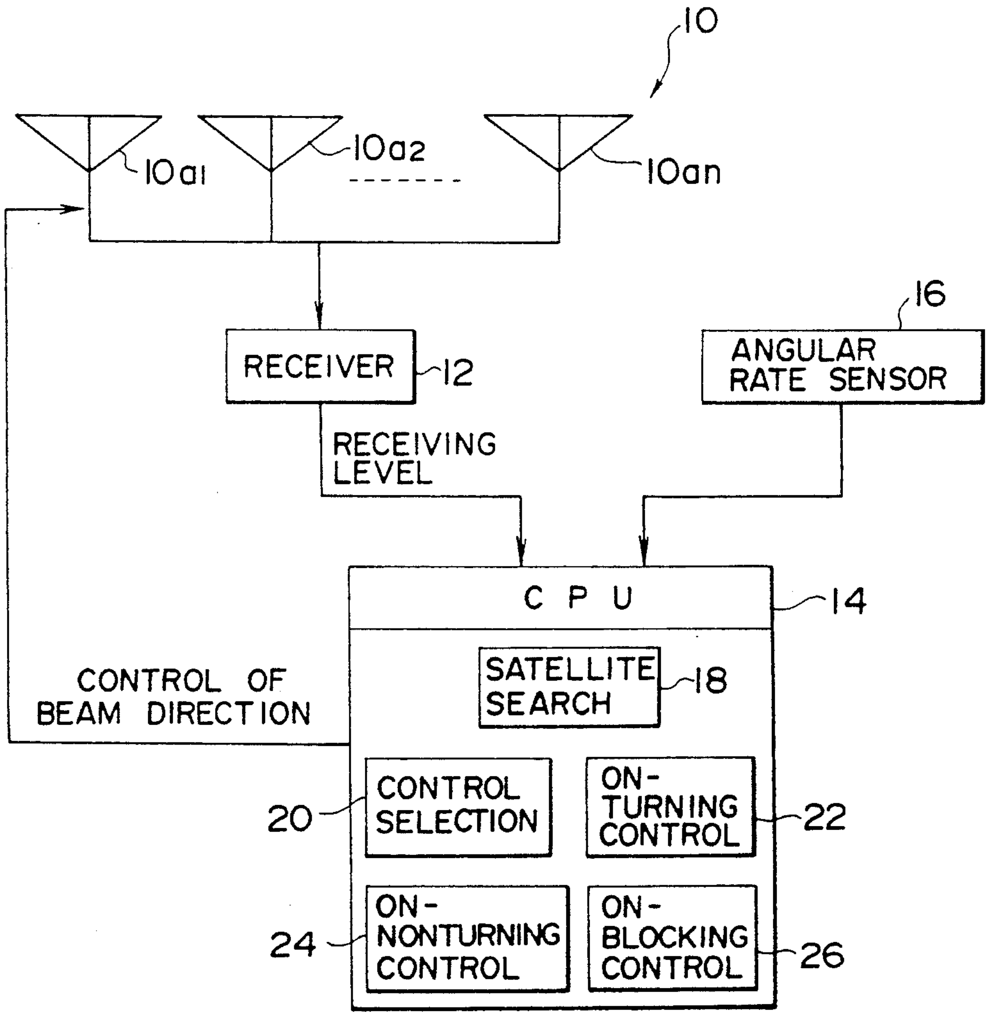
FIG. 1 is a schematic block diagram of one embodiment of an antenna system constructed in accordance with the present invention.

Referring first to FIG. 1, there is shown a mobile antenna system constructed in accordance with one embodiment of the present invention, which comprises an antenna 10 capable of being optionally controlled with respect to its beam direction. This antenna 10 may be in the form of a phased array antenna, the beam direction of which can be electrically controlled by using a phase shifter. More particularly, the antenna 10 may be a phased array antenna comprising a plurality of antenna elements 10*a*1 through 10*an*, the number of which elements is equal to n in number.

Signals received by the antenna 10 are then supplied to a receiver 12. The receiver 12 performs the conventional signal processing operations such as detection, amplification and others, with the resultant signals being then fed to the conventional signal processing system. In this embodiment, however, the receiver 12 is adapted to give the strength of received signal (hereinafter called "receiving level") to CPU 14.

In this embodiment, the turning detector section comprises an angular rate sensor 16 for detecting the orientation angle of the mobile, the resultant data being given to CPU 14. The angular rate sensor 16 may be of any one of various types such as gas rate gyro, vibrating gyro, laser gyro, mechanical rate gyro and others.

Although this embodiment will be described as to the angular rate sensor, any other angle sensor such as terrestrial magnetism sensor or the like may be used to perform the similar control.

In response to the receiving level from the receiver 12 and the angle data from the angular rate sensor 16, the CPU 14 controls the beam of the antenna 10. The CPU 14 comprises five sections:

(a) Satellite Direction Search Section

Satellite direction search section 18 is adapted to search a direction of satellite by scanning the antenna beam reception mode into the omnidirection and finding the direction of the satellite in which the receiving level becomes maximum. When the antenna 10 is controlled by the satellite direction search section 18, therefore, the satellite can be found from an initial state without any information regarding the satellite.

(b) Control Selector Section

Figure 2:
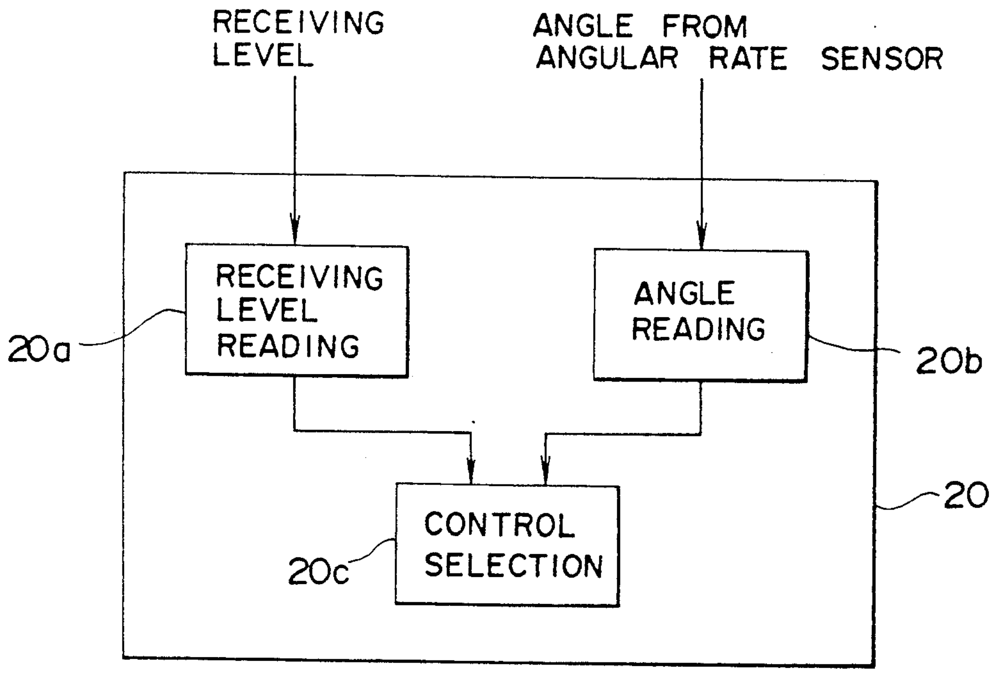
FIG. 2 is a block diagram of a control selector section.

Control selector section 20 comprises three parts, that is, a receiving level reading part 20*a*, an angle reading part 20*b* and a control selecting part 20*c*, as seen from FIG. 2. Depending on the receiving level and the orientation angle of the mobile, the control selecting part 20*c* selects optimum one of three control parts, that is, a turning control part 22, a non-turning control part 24 and a signal blocking control part 26. In such a manner, the antenna will be controlled.

(c) On-Turning Beam Control Section

Figure 3:
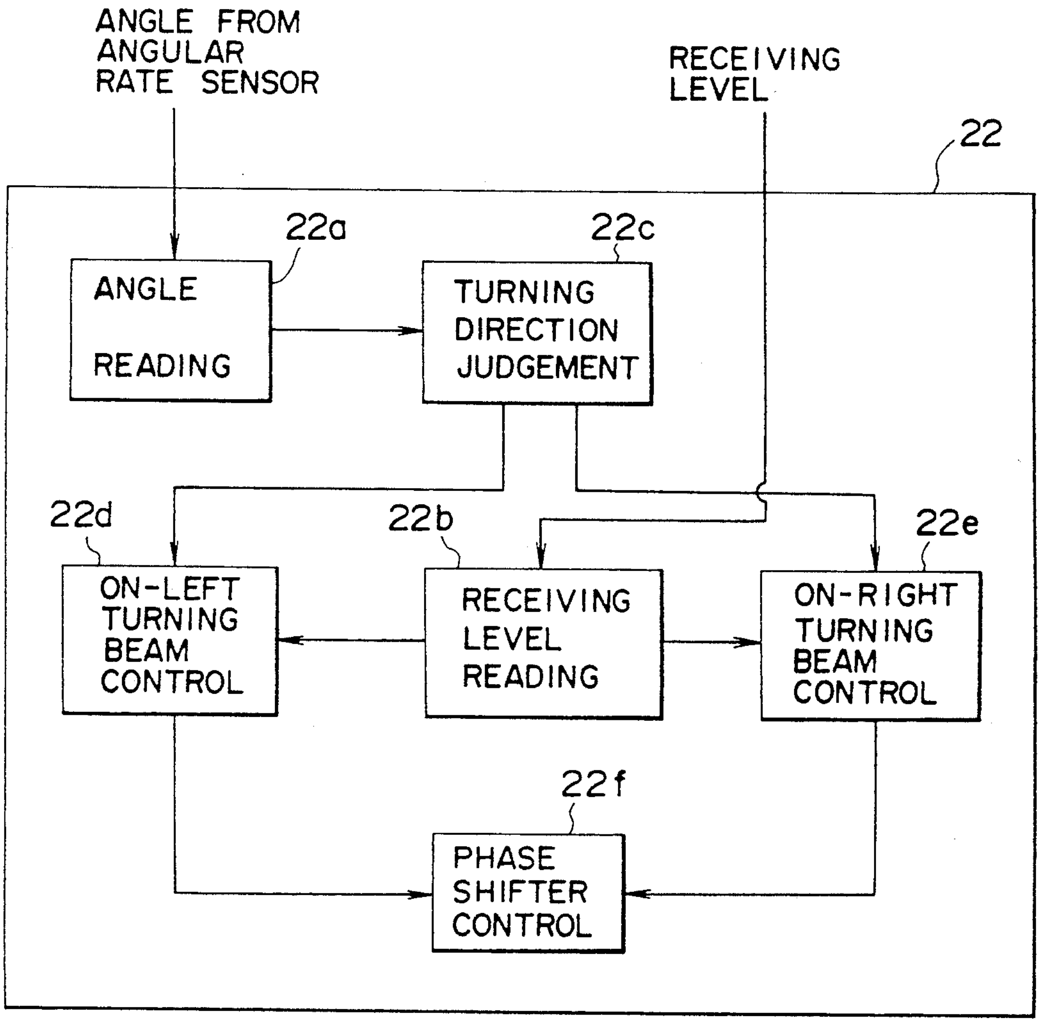
FIG. 3 is a block diagram of a turning control section.

On-turning beam control section 22 comprises an angle reading part 22*a*, a receiving level reading part 22*b*, a turning direction judging part 22*c*, a left-hand turning beam control part 22*d*, a right-hand turning beam control part 22*e* and a phase shifter control part 22*f*, as seen from FIG. 3. The on-turning beam control section 22 controls the beam of the antenna when the vehicle turns. More particularly, the beam of the antenna 10 is moved to be directed to the satellite, depending on data relating to the turn direction of the mobile.

(d) On-Nonturning Beam Control Section

Figure 4:
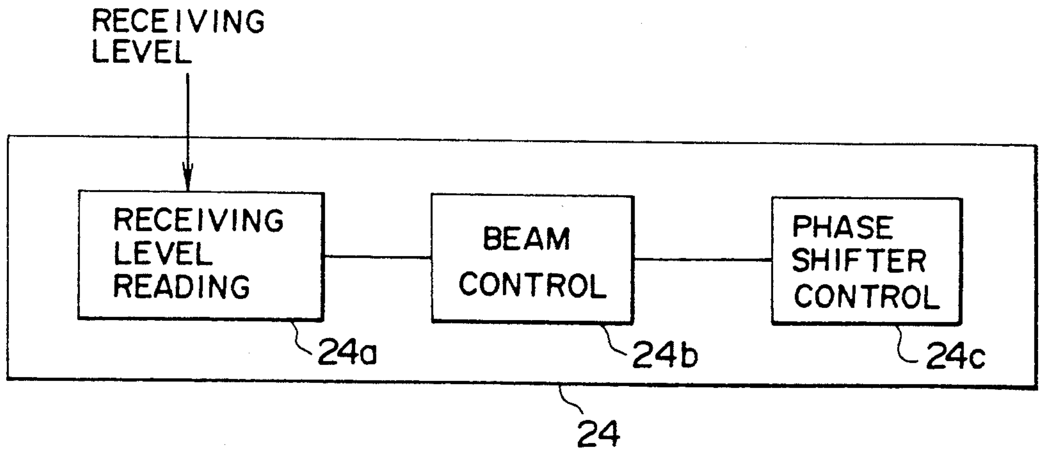
FIG. 4 is a block diagram of a non-turning control section.

On-nonturning beam control section 24 comprises a receiving level reading part 24*a*, a beam control part 24*b* and a phase shifter control part 24*c*, as seen from FIG. 4. The on-nonturning beam control section 24 controls the antenna when the vehicle is moving on gently curved and straight roads. If the vehicle is moving straight or substantially straight, it is not basically required to change the direction of beam. Thus, the on-nonturning beam control section 24 will only judge whether or not the receiving level is equal to or higher than a predetermined threshold, while maintaining the direction of beam constant.

(e) On-Blocking Beam Control Section

Figure 5:
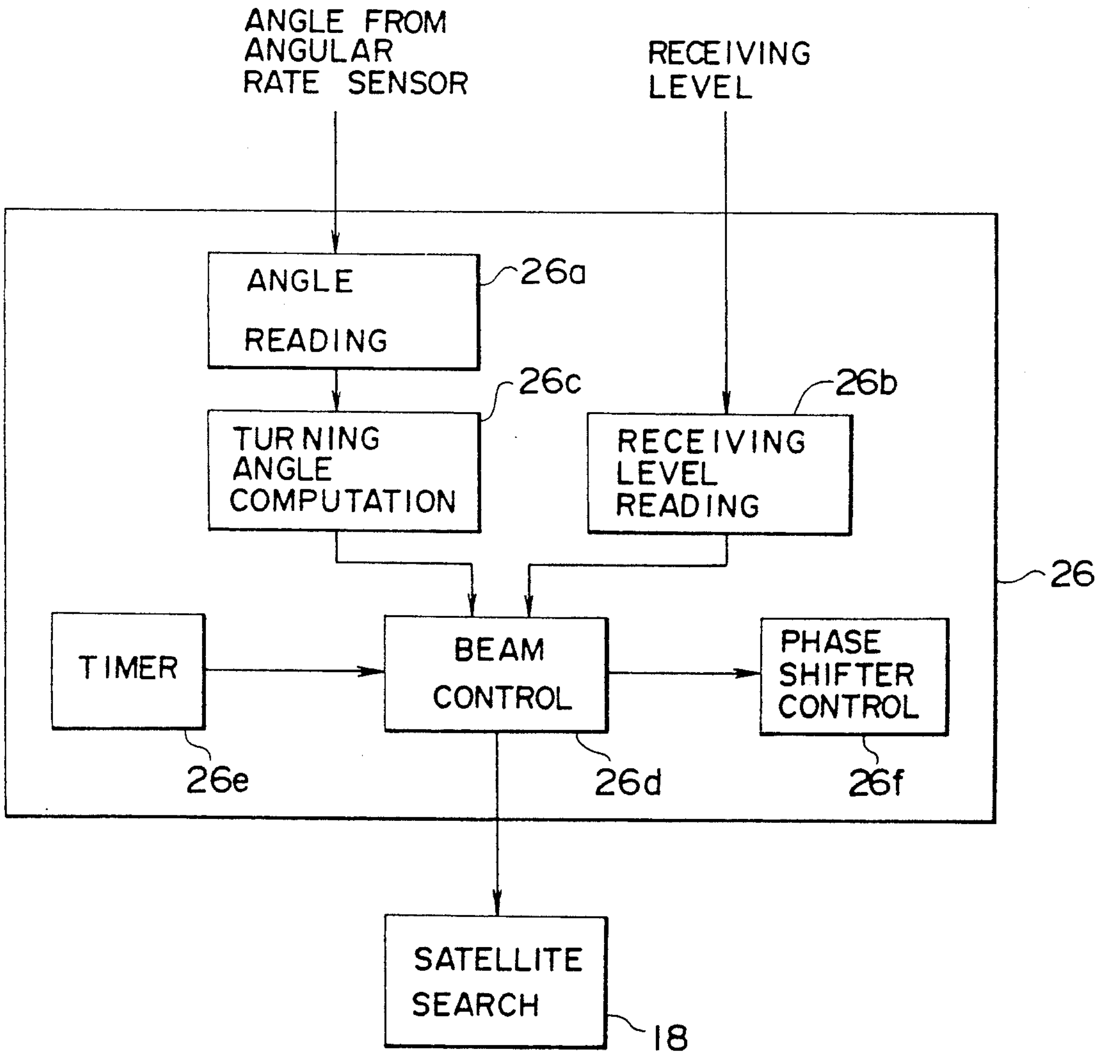
FIG. 5 is a block diagram of a radiowave blocking control section.

On-blocking beam control section 26 comprises an angle reading part 26*a*, a receiving level reading part 26*b*, a turning angle computing part 26*c*, a beam controlling part 26*d*, a timer 26*e* and a phase shifter control part 26*f*, as seen from FIG. 5. The on-blocking beam control section 26 controls the antenna when radiowaves are completely blocked by buildings or the like. Since no signal is received by the antenna in such a situation, the direction of beam in the antenna 10 will be controlled by the information of the angular rate sensor 16. The direction of the satellite can be predicted from the information of the sensor 16. The beam of the antenna 10 is directed to the known direction of the satellite. However, this method may provide a wrong value in the turning angle because of accumulating angular errors. In order to avoid such a problem, the beam is scanned in the omnidirectional direction to re-confirm the direction of the satellite after passage of a given time period.

Figure 6:
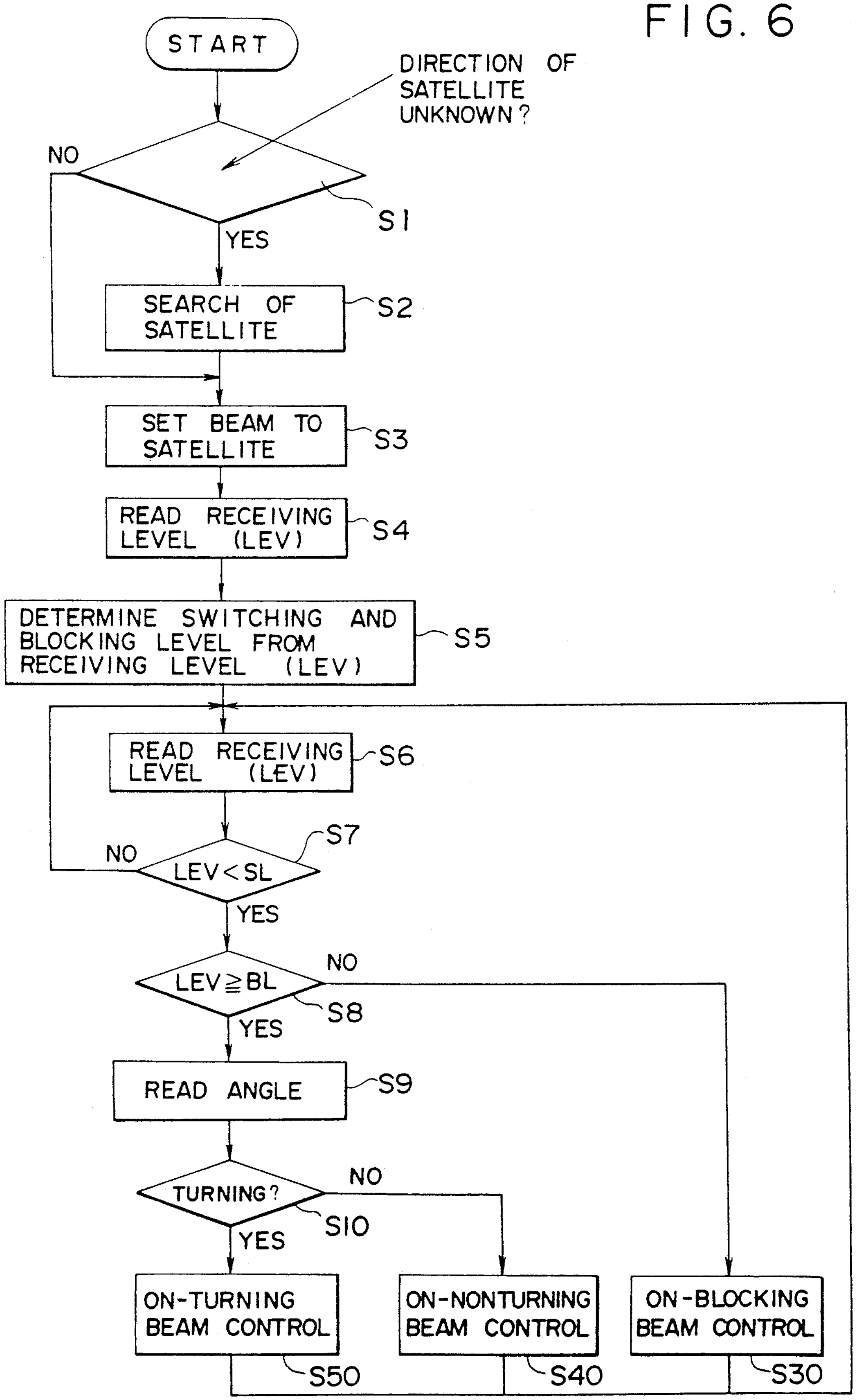
FIG. 6 is a flow chart illustrating the operation of the antenna system.

The control operation of the antenna 10 in this embodiment will now be described with reference to FIG. 6.

In the beginning of the operation, the satellite search section 18 first judges whether or not the direction of the satellite is unknown (S1). Normally, the direction of the satellite will be searched since it is unknown (S2).

When the satellite direction is known on termination of the search (S2), the maximum receiving level and the direction of beam are stored.

When the search of the satellite direction (S2) is terminated or when the satellite direction has been known, the beam is pointed toward that satellite direction (S3).

Next, the control selecting section 20 selects one of the on-turning beam control, the on-nonturning beam control and the on-blocking beam control (S5–S10).

For this purpose, the receiving level reading part 20*a* reads a receiving level LEV of a signal which is received using the beam set at S3 (S4).

After obtaining a receiving level switching level SL and blocking level BL are determined from the receiving level LEV (S5) at the control selecting part 20*c*.

The switching level SL is a reference level used when the direction of beam in the antenna 10 is to be switched in the other direction. When a signal is received in a certain direction and if its receiving level LEV is lower than the switching level SL, that beam is switched to an adjacent beam. The blocking level BL is a level used when it is judged that the radiowave is blocked. If the receiving level LEV is lower than the blocking level TL, the tracking will be performed using on the output of the angular rate sensor 16 which has been read into the angle reading part 20*b*. It should be determined that the switching level SL is the value lower than the maximum receiving level LEVMAX by a given amount and that the blocking level TL is substantially lower than the maximum receiving level LEVMAX.

When the switching and blocking levels (SL and BL) are determined through S4 and S5, these levels are used to control the direction of beam of the antenna 10.

If the receiving level LEV is larger than the switching level SL, this means that a signal with sufficient strength is received in the current direction of the beam. It is thus not required to change the direction of the beam. When the receiving level LEV is larger than the value of SL, therefore, the reading of the receiving level LEV and the comparison between the receiving and switching levels will be repeated.

If the receiving level LEV is smaller than the value of SL, the direction of the beam may be changed. It is thus judged whether or not the receiving level LEV is smaller than the blocking level BL (S8).

If the receiving level LEV is smaller than the value of BL, it is judged that the radiowave from the satellite is blocked. The on-blocking beam control is thus carried out (S30). Thereafter, the process is returned to the receiving level reading step (S6).

If the receiving level LEV is larger than the blocking level BL, it is judged that the radiowave is not blocked and that the antenna beam is in the different direction. The process reads the angle from the angular rate sensor 16 (S9). From the comparison between the current and former angles, it is judged whether or not the mobile is turning (S10).

If it is judged that the mobile is not turning, the on-nonturning beam control is carried out (S40). If the mobile is turning, the on-turning beam control is performed (S50). After these controls, the process will return to the receiving level reading step (S6).

The description will now be made individually to the satellite search (S2), on-blocking beam control (S30), on-nonturning beam control (S40) and on-turning beam control (S50).

SEARCH OF SATELLITE

Figure 7:
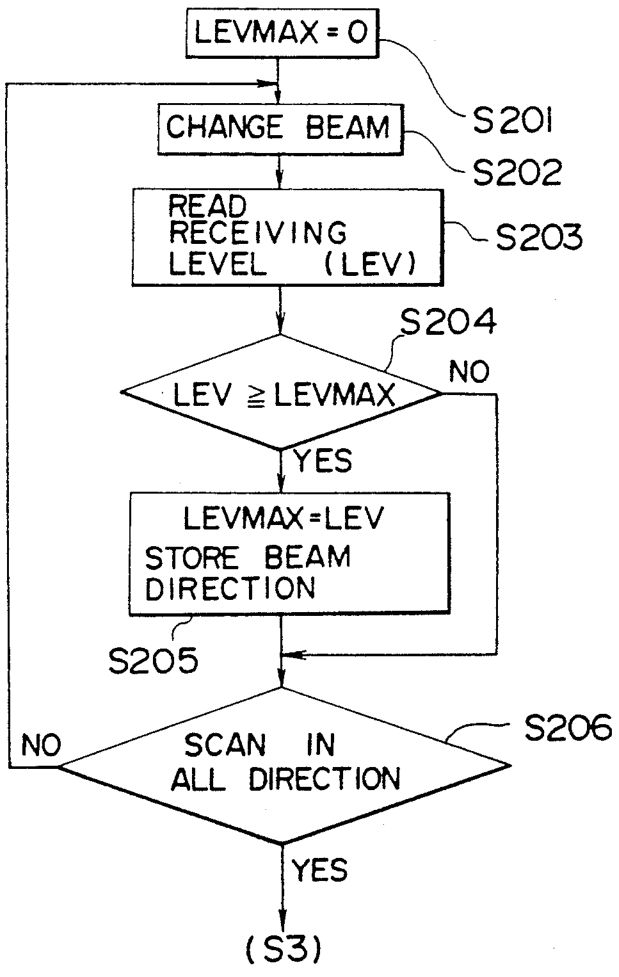
FIG. 7 is a flow chart illustrating the satellite direction search (S2) operation.

The search of satellite (S2) will be described with reference to FIG. 7.

The search of satellite direction is accomplished by the satellite direction search section 18 in the CPU 14. First of all, a value of LEVMAX which is representative of the maximum receiving level (S201) is set at zero. The direction of the current beam is then changed (S202). The process reads a receiving level LEV in the newly set direction of beam (S203).

If the receiving level LEV is larger than the value of LEVMAX (S204), the value of LEVMAX is replaced to the value of LEV now sensed and the direction of beam at this time is memorized (S205).

Until the beam is scanned in the omnidirection, the process is repeated (S206). After the search of satellite direction has been completed, the beam is set toward the satellite (S3).

ON-BLOCKING BEAM CONTROL

Figure 8:
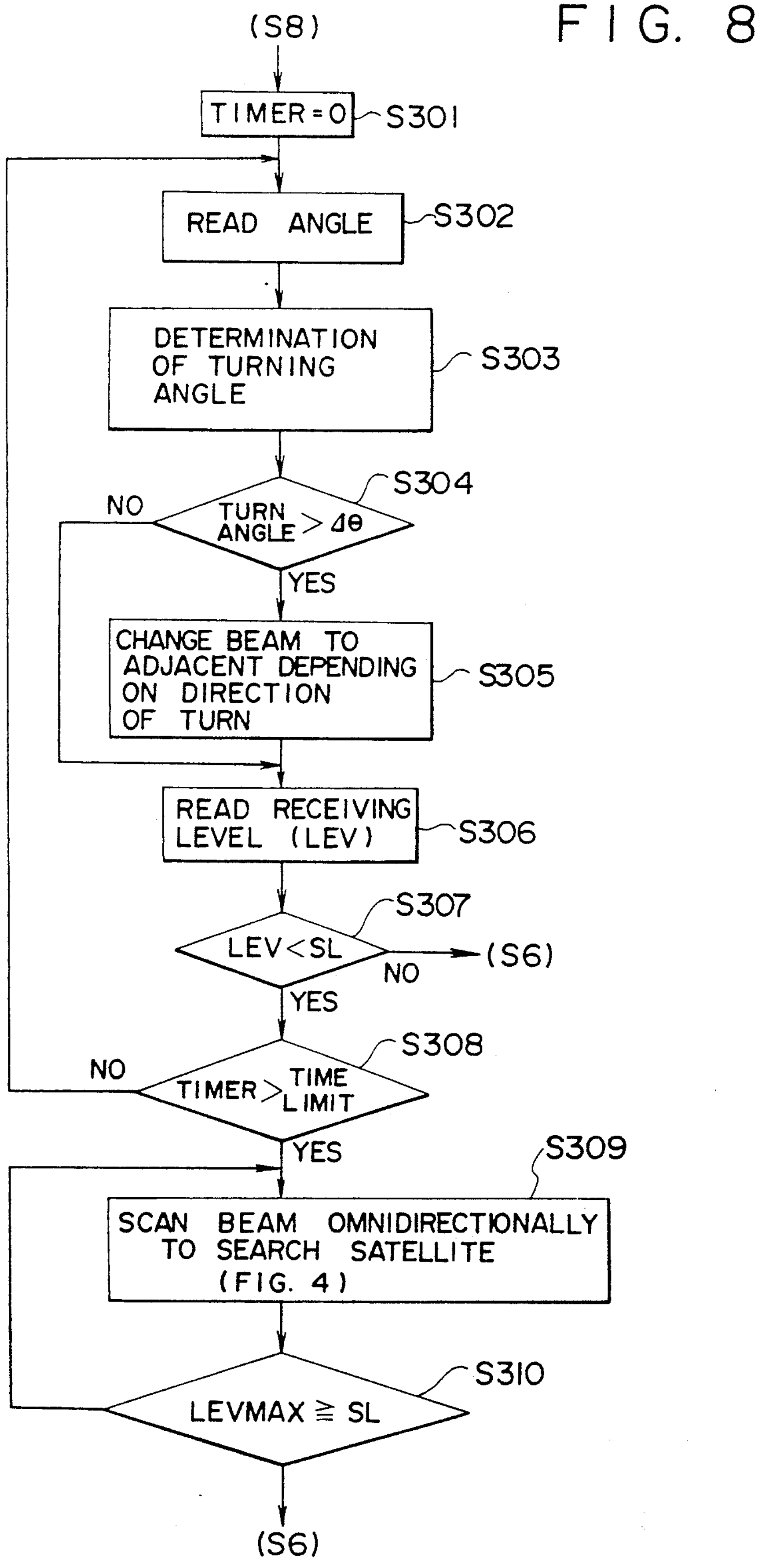
FIG. 8 is a flow chart illustrating the beam control (S30) operation when the radiowaves are blocked.

This control (S30) will be described with reference to FIG. 8.

The on-blocking beam control is accomplished by the radiowave blocking controlling section 20 in the CPU 14. This controlling section 20 computes a turning angle using the information from the angular rate sensor 16, the resultant value being used to actuate the beam controlling part 26*d* such that the beam is maintained toward the satellite.

In the on-blocking beam control (S30), a value of TIMER relating to time in the timer 26*e* is first set at zero (S301).

Data from the angular rate sensor 16 is then read into the angular rate reading section 26 (S302), the data is used to determine the turning angle at the turning angle computing part 26*c* (S303).

If this value of turning angle exceeds the angle $\Delta\theta$ between adjacent two beams, the beam controlling part 26*d* replaces the current beam by the adjacent beam (S304, S305).

If the turning angle does not exceed said angle $\Delta\theta$ or when the beam is changed to the adjacent beam depending on the direction of turn, a receiving level LEV in that beam direction is read in (S306). This value of LEV is then compared with a switching level SL (S307).

If the value of LEV is larger than the value of SL, the beam in the current direction can perform its sufficient reception. Thus, this direction is maintained and the process is returned to the reading step (S6) for reading the next receiving level LEV.

If the value of LEV is smaller than the switching level SL, it is judged whether or not the value of TIMER is larger than a predetermined waiting time TIMELIMIT (S308). The process will be repeated from the angle reading step (S302) to the receiving level comparing step (S307) until this time reaches the waiting time TIMELIMIT.

Turning angle obtained from the angular rate sensor may deviate from the actual turning angle due to the accumulation of any error of angular rate sensor. Thus, the waiting time TIMELIMIT should be set depending on the precision of a sensor used therein.

If the receiving level LEV did not exceed the switching level SL within the aforementioned time period, it is judged that the satellite is missed. The satellite search section 18 is thus actuated to perform the satellite searching step as in S2 (S309). The process is continued until the value of LEVMAX exceeds the switching value of SL (S310). As the receiving level exceeds the value of SL, the phase shifter control part 26*f* sets the phase shifter to change the beam in that direction. The process is returned to the receiving level reading step (S6).

ON-NONTURNING BEAM CONTROL

Figure 9:
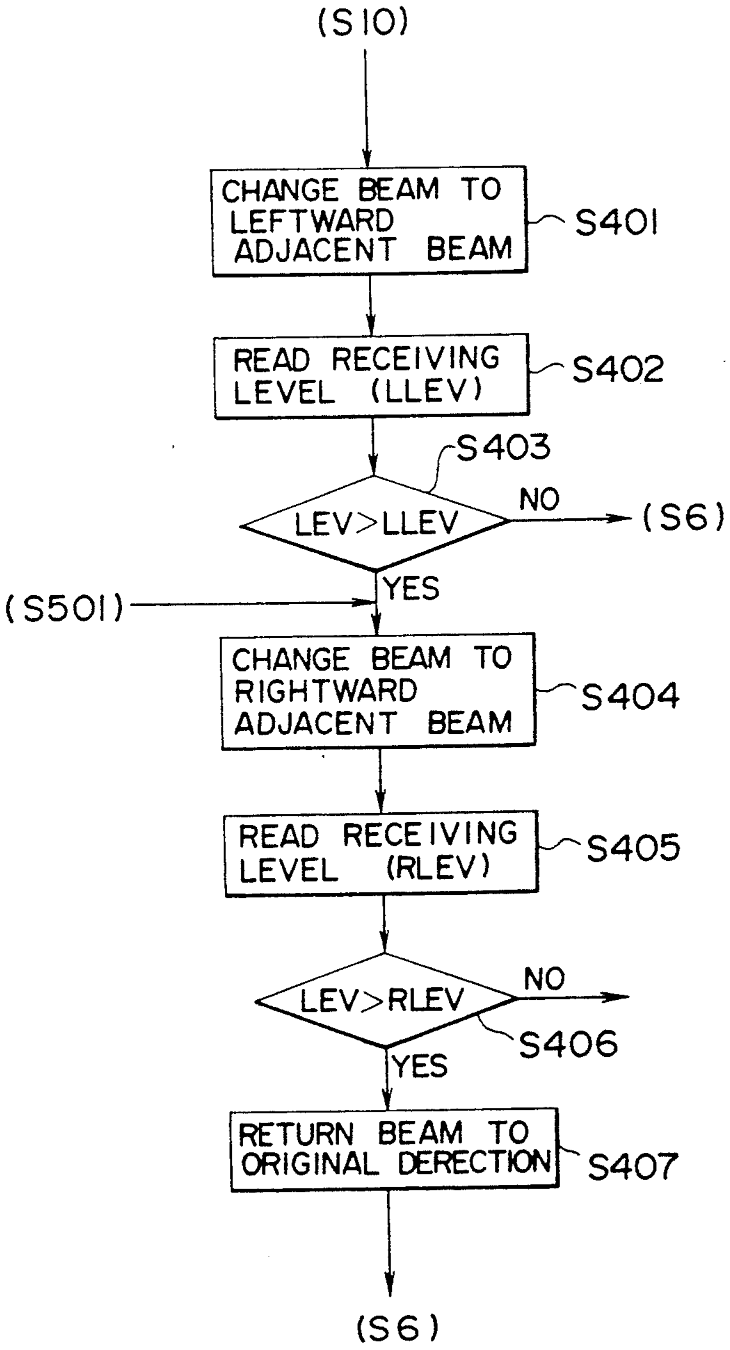
FIG. 9 is a flow chart illustrating the beam control (S40) operation when the mobile is moving straight.

The process is moved to the on-nonturning beam control (S40) if at the step (S10), it is judged that the mobile is not in turning. The on-nonturning beam control (S40) will be accomplished in accordance with such a procedure as shown in FIG. 9.

Even when the mobile is moving on a straight road, the direction of movement in the mobile may be slightly changed. In such a case, since the receiving level LEV may be lower than the switching level S1 and higher than the blocking level BL, the direction of beam must be shifted. For such a purpose, the direction of beam is first changed to the left-hand adjacent beam (S401). In this direction, a receiving level LLEV is then read in the receiving level reading part 24*a* (S402). The beam controlling part 24*b* then compares the value of LLEV with the receiving level before such a changing (S403).

If the value of LLEV after beam changing is larger than the value of LEV before beam changing, it is judged that the beam is properly directed to the satellite. The process is then returned to the receiving level reading step (S6). If the value of LLEV is smaller than the value of receiving level before the beam changing, it is judged that the beam is not properly directed to the satellite. The process is then performed such that the beam is changed to the right-hand adjacent beam relative to the original direction.

A receiving level RLEV in this direction is then read in the receiving level reading part 24a (S405). Subsequently, the value of RLEV is compared with the previous receiving level LEV at the beam control part 24b (S406).

If the value of RLEV is larger than the previous receiving level LEV, it is judged that the beam is properly directed to the satellite. The process is then returned to the receiving level reading step (S6). If the value of RLEV is smaller than the previous receiving level LEV, it is judged that the beam is not properly directed to the satellite. Thus, the beam is returned to the original direction (S407). The process is repeated starting from the receiving level reading step (S6).

The beam changing operation is controlled by the phase shifter control part 24c.

ON-TURNING BEAM CONTROL

Figure 10:
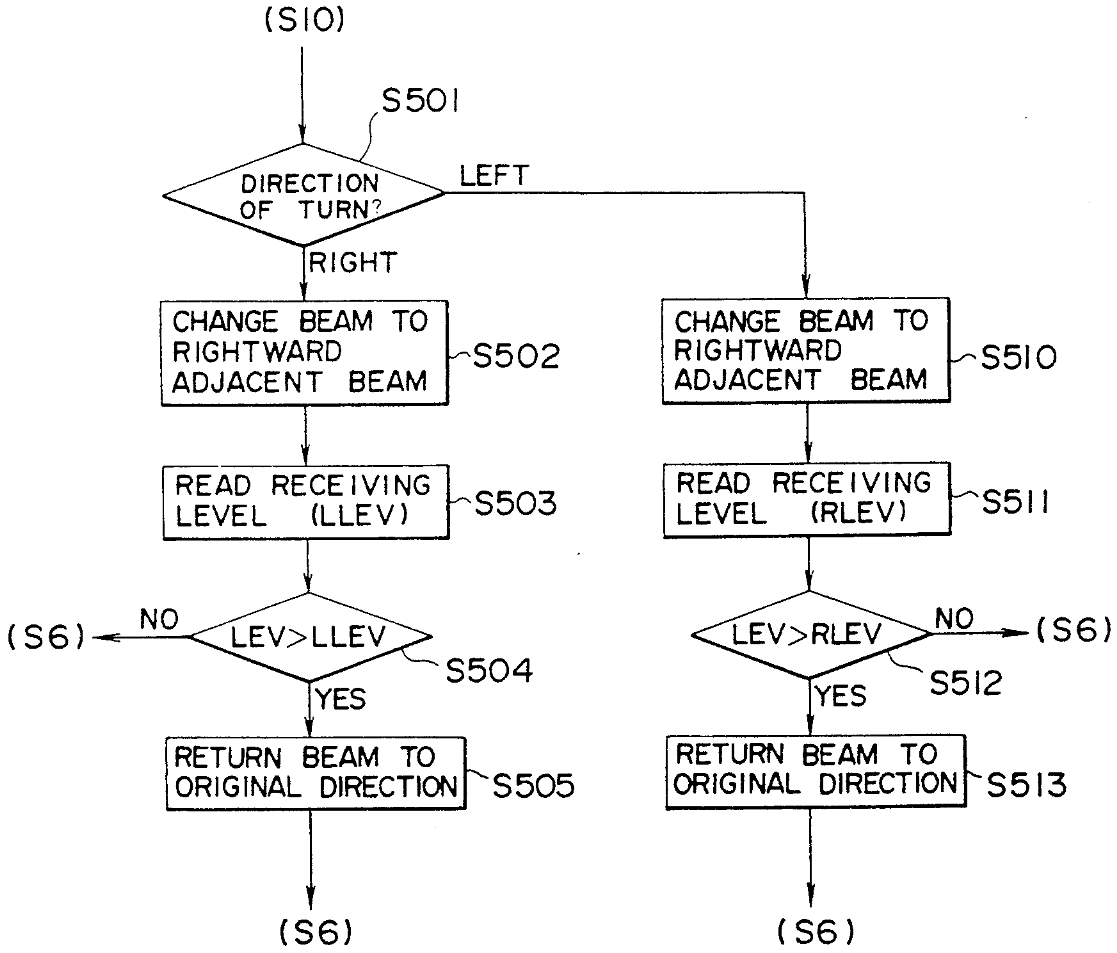
FIG. 10 is a flow chart illustrating the beam control (S50) operation when the mobile is turning.

If it is judged that the mobile is now turning at the step (S10), the on-turning beam control (S50) is performed by the on-turning beam controlling part 14b. This will now be described with respect to FIG. 10.

Judgement is first made what direction the mobile is turned in (S501). This judgement is accomplished by the turning direction judging part 22c from the information of the anglular rate reading part 22a. If the mobile is turning rightward, the on-right-turning beam control part 22e actuates the phase shifter part 22f so as to shift the beam in the antenna 10 to the left-hand adjacent beam (S502). In such a direction, a receiving level LLEV is read in (S503) and then compared with the previous receiving level LEV (S504).

If the value of LLEV is smaller than the previous receiving level LEV, it is judged that the beam is not properly directed to the satellite. The beam is returned to its original direction (S505). The process is returned to the receiving level reading step (S6).

If the value of LLEV is larger than the previous receiving level LEV, the process is returned to the receiving level reading step (S6) while maintaining the beam direction.

If the turning direction judging part 22c judges that the mobile is now turning leftward (S501), the on-left-turning beam control part 22d actuates the phase shifter control part 22f so as to change the beam to the right-hand adjacent beam (S510). At this time, a receiving level RLEV is read in (S511) and then compared with the previous receiving level LEV (S512). If the value of RLEV is larger than the previous receiving level LEV, the process is returned to the receiving level reading step (S6). If not so, the beam is returned to its original direction (S513) while the procedure is returned to the receiving level reading step (S6).

These steps S510 to S513 in the on-turning beam control (S50) are completely similar to the steps S404 to S407 in the on-nonturning beam control (S40). If it is judged at the step S501 that the mobile is turning leftward, therefore, the procedure may go to the step S404 in the on-nonturning beam control (S40). As a result, the steps S404 to S407 may be common to the steps S510 to S513.

The antenna system according to this embodiment can utilize data of the angle from the angular rate sensor 14 to track the satellite and provide the following advantages:

(a) Radiowaves from satellite can be stably received since no changing of beam is carried out in the case of straight movement of the mobile.

(b) The beam will not be changed to any unnecessary direction since the angular rate sensor detects the direction of mobile turning.

(c) Even when radiowaves are blocked, the state of the turning can be known by using the angular rate sensor. Since the control of beam is performed depending on the sensed state of the turning, the satellite can be continued to be substantially accurately searched such that the reception will be properly re-started immediately after the strength of radiowave has been restored.

If the blocking of radiowave continues for a relatively long time period, the omnidirectional scan is performed to re-search the satellite.

In such a manner, it can be reliably avoided that even if the satellite becomes visible, the restoration of reception is disturbed due to any error which may occur when the tracking is carried out only by the angular rate sensor.

Some examples of a phased array antenna which are preferable in the present invention will be described below.

FIRST EXAMPLE OF PHASED ARRAY ANTENNA

Figure 11:
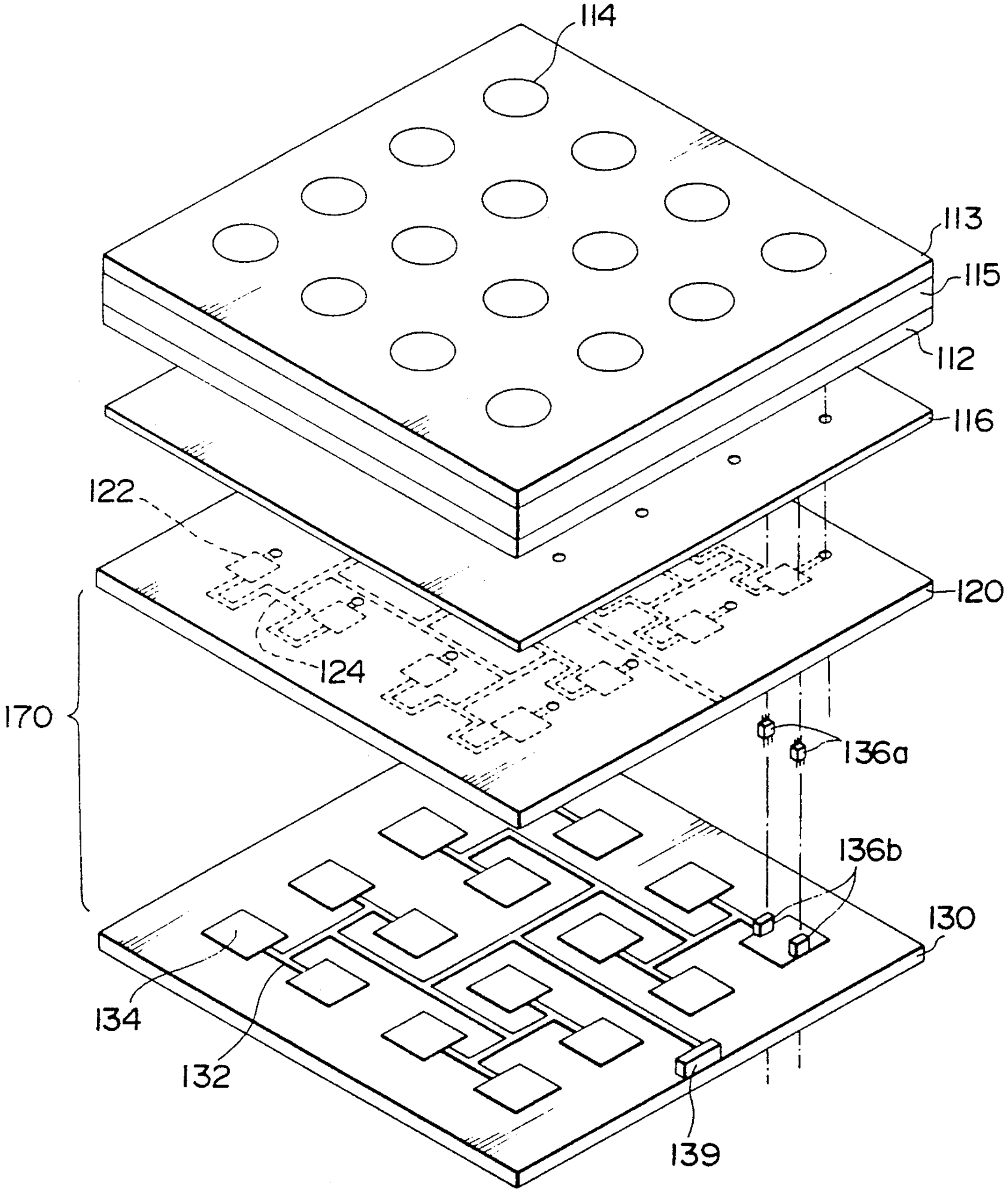
FIG. 11 is a perspective view of a phased array antenna in the first embodiment of the present invention.
Figure 15:
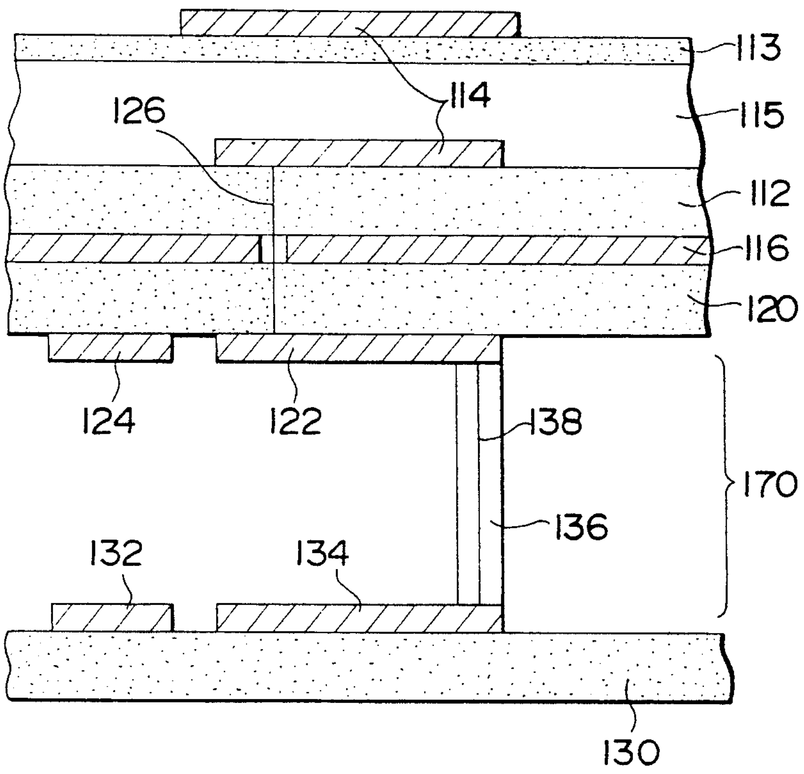
FIG. 15 is a schematic cross-section of the phased array antenna in the first embodiment.

FIG. 11 is a perspective view of the first example of the phased array antenna while FIG. 15 is a cross-sectional view of this phased array antenna.

Referring first to FIG. 11, the phased array antenna comprises an antenna element layer consisting of sixteen stacked microstrip antenna elements 114 which are arranged on the two dielectric substrates 112, 113 in the form of rectangular lattice; and a feeding network layer including phase shifters 122 and power dividers 124, these phase shifters and power dividers being arranged on the opposite side of the dielectric substrate 120 at positions corresponding to the antenna element 114. As seen from FIG. 15, the antenna element layer is closely connected to the feeding network layer through a ground plane 116. Within an air gap 170 below the feeding network layer, there is formed a drive circuit layer which comprises a drive circuit 134 and a control line 132, these components being arranged on a circuit substrate 130 at a position opposed to each of the phase shifters 122. In such a manner, the antenna element, feeding network and drive circuit layers are stacked one above another in the order described herein.

Although the antenna elements 114 have been described as to the rectangular lattice arrangement, they may be arranged in any suitable configuration, for example, such as triangular lattice fashion.

The antenna elements 114 on the two dielectric substrates 112, 113 may be formed on a copper film over the substrate by the use of any suitable means such as etching or the like.

In order to reduce the entire thickness of the antenna, it is particularly required that the feeding network is smaller and thinner in structure. The layout is also important.

In the first example, the phase shifters 122 and power dividers 124 on the feeding network layer are made with microstriplines or the like which are formed on the dielectric substrate 120 over the whole surface thereof. Then, the antenna element layer may be closely connected to the feeding network layer through the common ground plane 116.

Radio-frequency signals may be supplied to the antenna through feed pins 126 each of which connects each of the antenna elements 114 with the corresponding one of the phase shifters 122.

In this example, one-point feeding is thus made to the antenna. By suitably selecting the configuration of the antenna element 114 and the feeding point, the antenna may be excited of either linear polarization or circular polarization. A circular polarization may be excited by feeding 90° phase different radio-frequency signals to two points having different angle of 90° relative to the center of the antenna element.

Figure 12:
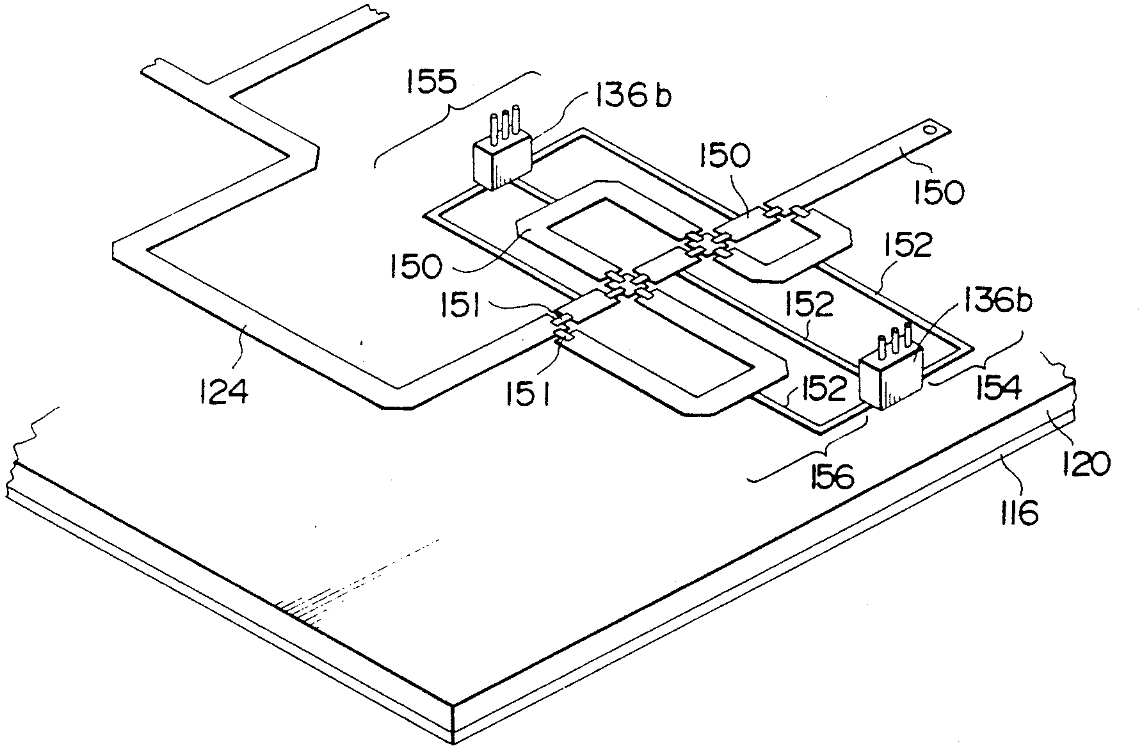
FIG. 12 is a perspective view of a phase shifter.

As shown in FIG. 12, each of the phase shifters 122 comprises microstriplines 150, PIN diodes 151, bias lines 152 and connectors **136*b* adapted to connect with the drive circuit 134. Such a phase shifter is known as switch-lined phase shifter. Each of the PIN diodes 151 is switched by a bias current which is supplied through the corresponding bias line 152**.

Figure 13:
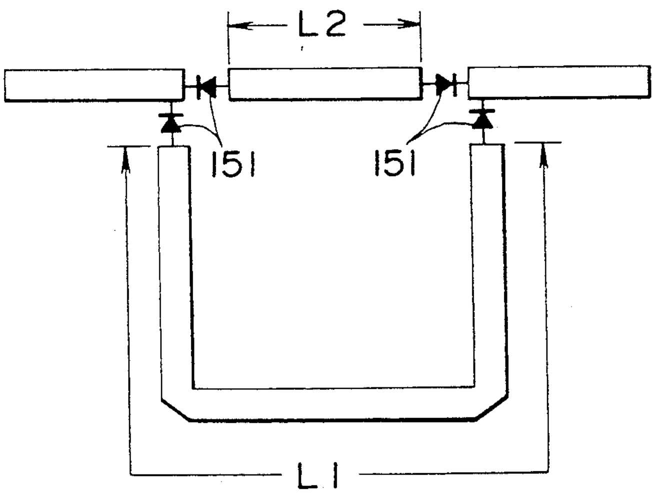
FIG. 13 illustrates the operation of the phase shifter.

The operation of each switch-lined phase shifter will be described with reference to FIG. 13. This phase shifter is adapted to change the phase from one to another by performing the switching between microstriplines L1 and L2 different in length when bias current is applied to the PIN diodes 151. The differential phase $\phi$ at this time is represented by:

$$\phi = 360 \times (L1 - L2)/\lambda$$

where $\lambda$ is a wavelength used.

As seen from FIG. 12, this embodiment utilizes such an arrangement that differences between two line lengths are set to be 45°, 90° and 180° and that three switch-lined phase shifters 154, 155 and 156 are connected in tandem with one another to form three-bit phase shifters which are variable each 45° through 360°. The number of bits on one phase shifter depends on the granularity beam positions expected. When the number of bits are increased, the granularity of beam positions becomes small although the structure becomes more complicated.

Although this embodiment has been described as to the switch-lined phase shifter, the present invention may be applied to other type phase shifter, such as loaded-lined phase shifter and hybrid-coupled phase shifter.

Figure 14:
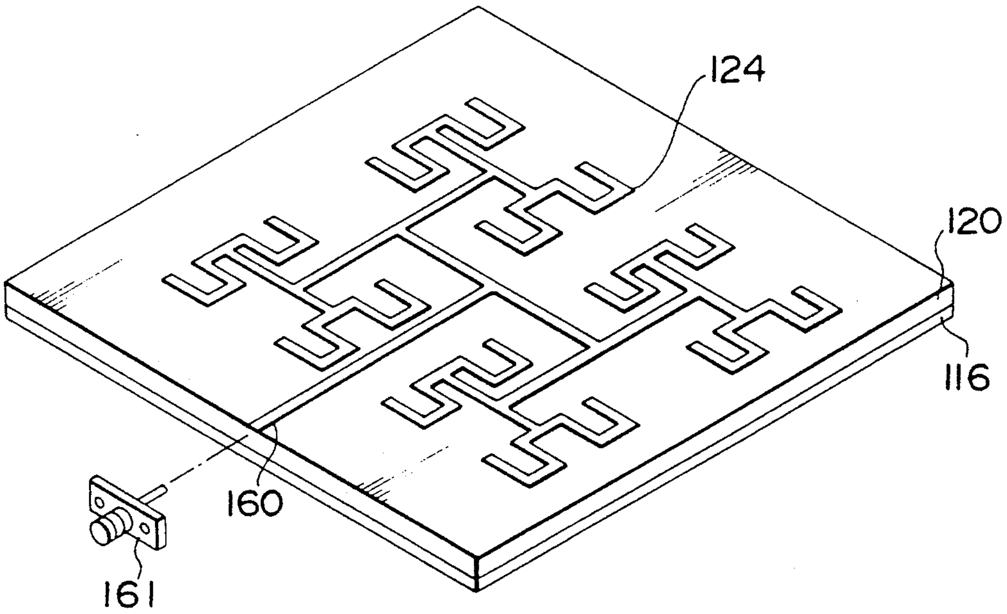
FIG. 14 is a perspective view of a power divider.

FIG. 14 shows a structure of power divider. The power divider 124 is made of microstripline which is formed on the dielectric substrate 120. The power divider 124 includes an input/output terminal 160 through which a radio-frequency signal enters the power divider and is finally distributed into 16 parts through 11 two-branch parts, thus being fed to the respective phase shifters 122. The input/output terminal 160 is connected with a coaxial connector 161. The inner conductor of the coaxial connector 161 is connected to the power divider 124 while the outer conductor thereof is connected to the ground plane 116.

In operation, a radio-frequency signal inputted to the power divider 124 is divided into 16 parts each of which is inputted to the respective one of the phase shifters 122. At each of the phase shifter 122, the signal phase is varied depending on the direction of the beam and then supplied to the respective one of the radiating patches 114 through the corresponding feed pin 126. The signal will be transmitted as radiowave from the antenna elements.

Although the present invention has been described mainly as to transmission, it may be similarly applied to reception.

The circuit substrate 130 which is the drive circuit layer is disposed with the air gap 170 below the feeding network layer. Again, the drive circuit layer comprises the drive circuit 134 for driving the PIN diode in the phase shifter 122 and the control line 132 for controlling the drive circuit 134. It is required herein that the air gap 170 has a thickness equal to about 10 mm for preventing the property of the feeding network layer from degrading due to proximity to the drive circuit layer.

Figure 16:
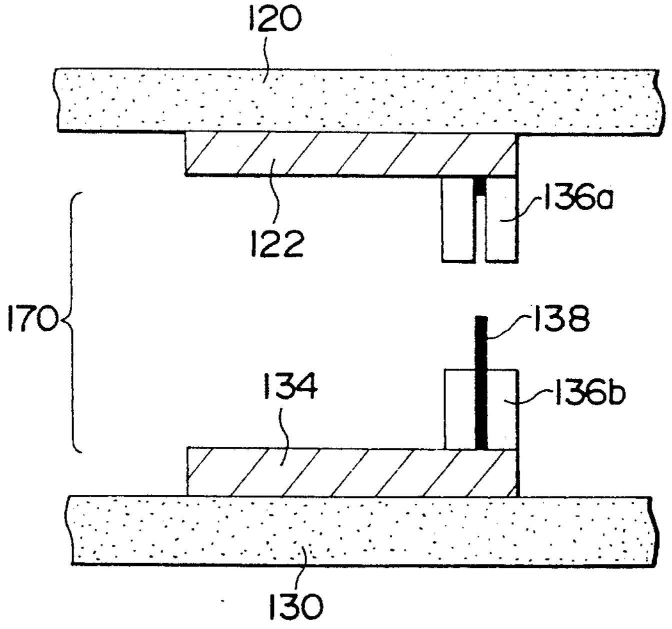
FIG. 16 is a cross-sectional view of the connection between the phase shifter and a drive circuit in the first embodiment.

Each of the phase shifters 122 is connected with the corresponding one of the drive circuits 134 through a connector **136*a* on the drive circuits 134 and another connector 136*b* on the phase shifter 122, as seen from FIG. 16. Each of the drive circuits 134 is connected to the control line 132 which is in turn connected with any external controller through a connector 139**.

Figure 17:
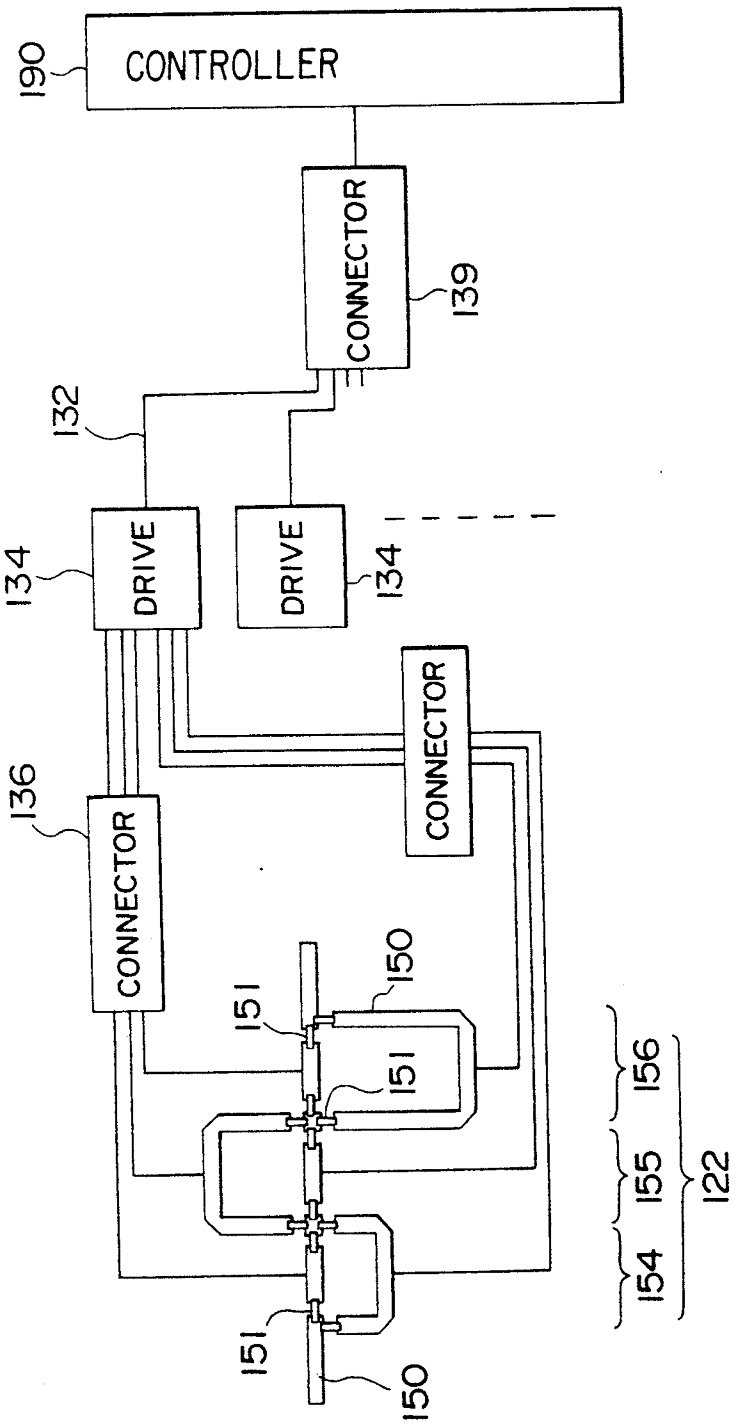
FIG. 17 illustrates the connection of the drive circuit.

Each of the drive circuits 134 is also connected with a controller 190, as shown in FIG. 17. Command signals from the controller 190 are sent to the respective drive circuit 134 through the connector 139. Each drive circuit 134 is connected with the corresponding one of the phase shifter with the six control lines corresponding to the 45° bit 154, 90° bit 155 and 180° bit 156.

As will be apparent from the foregoing, the present invention can provide a phased array antenna which is constructed to be very thin by stacking necessary components (antenna elements, phase shifters, power dividers and drive circuits).

SECOND EXAMPLE OF PHASED ARRAY ANTENNA

Figure 18:
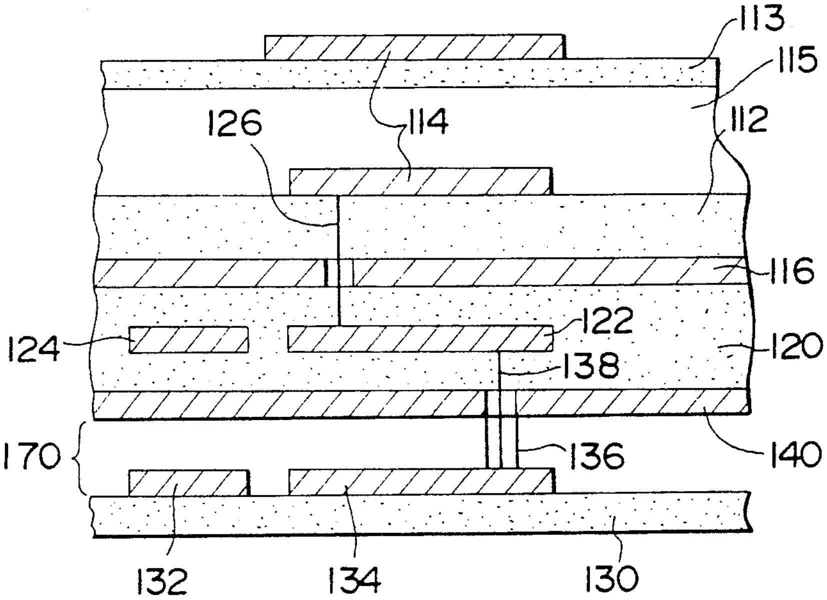
FIG. 18 is a schematic cross-sectional view of a phased array antenna in the second embodiment.

FIG. 18 shows, in cross-section, the second example of the phased array antenna.

Although the first example is of such a structure that the feeding network layer is made of microstripline on the dielectric substrate 120 at one side, the second example includes a feeding network layer consisting of phase shifters 122 and power dividers 124 which are formed in the dielectric substrate 120 by line conductors. The dielectric substrate 120 is closely interposed between two ground planes 116 and 140. The other parts are similar to those of the first example.

In the first example, it is required that the air gap 170 has a thickness equal to about 10 mm for preventing the property of the feeding network from degrading due to proximity to the drive circuit layer. However, the second example, the feeding network will not be affected by the proximity to the drive circuit layer. Thus, the air gap 170 between the feeding network layer and the drive circuit layer is reduced. As a result, the length of the connector 136 connecting the phase shifter 122 with the drive circuit 134 can be decreased. This can further reduce the thickness of the phased array antenna in comparison with the first example.

As in the first example, it is possible in the second example that the connector 136 is divided into two nested connector sections **136*a* and 136*b* as shown in FIG. 15**. By nesting these connector sections, therefore, the feeding network layer can easily be connected and disconnected with the drive circuit layer.

THIRD EXAMPLE OF PHASED ARRAY ANTENNA

Figure 19:
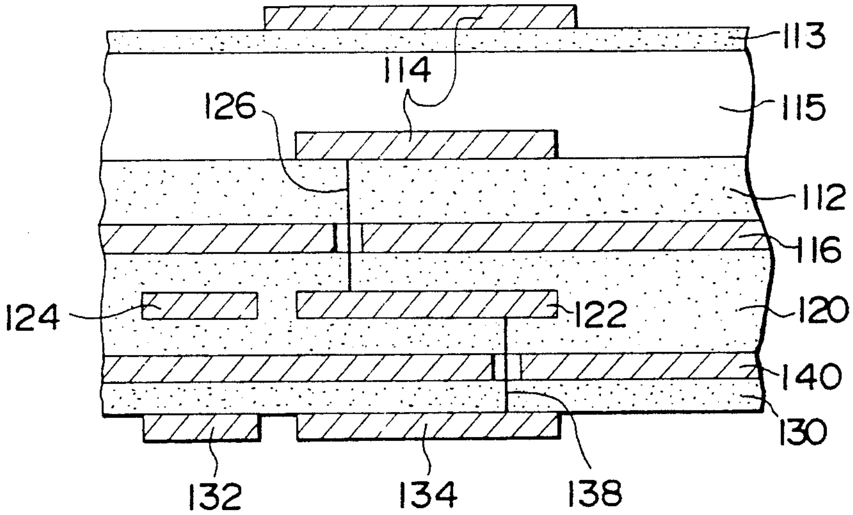
FIG. 19 is a schematic cross-section of a phased array antenna in the third embodiment.

FIG. 19 shows, in cross-section, the third example of the phased array antenna which is characterized in that the parts mounting surface of the drive circuit layer is disposed on the substrate at the opposite side to the feeding network layer 120. More particularly, the underside of the circuit substrate 130 includes the drive circuits 134 and the control lines 132. The drive circuits 134 are connected with the phase shifters 122 through pins 138.

As a result, the feeding network and drive circuit layers can be disposed closely to each other without any air gap therebetween. Thus, the entire thickness of the phase array antenna can be further reduced. In this example, furthermore, the antenna can be strengthened for vibration since there is no air gap without need of connector or the like.

All the antennas in the first to third examples are very thin in thickness. Even if they are mounted on vehicle's roof or the like, their air resistance can be very small while the appearance of the vehicle will be least affected by the antennas.

ARRANGEMENT OF ANTENNA ELEMENTS

There will be described the structure of a microstrip antenna element which is most preferable for use in the phased array antenna constructed according to the present invention.

Figure 20:
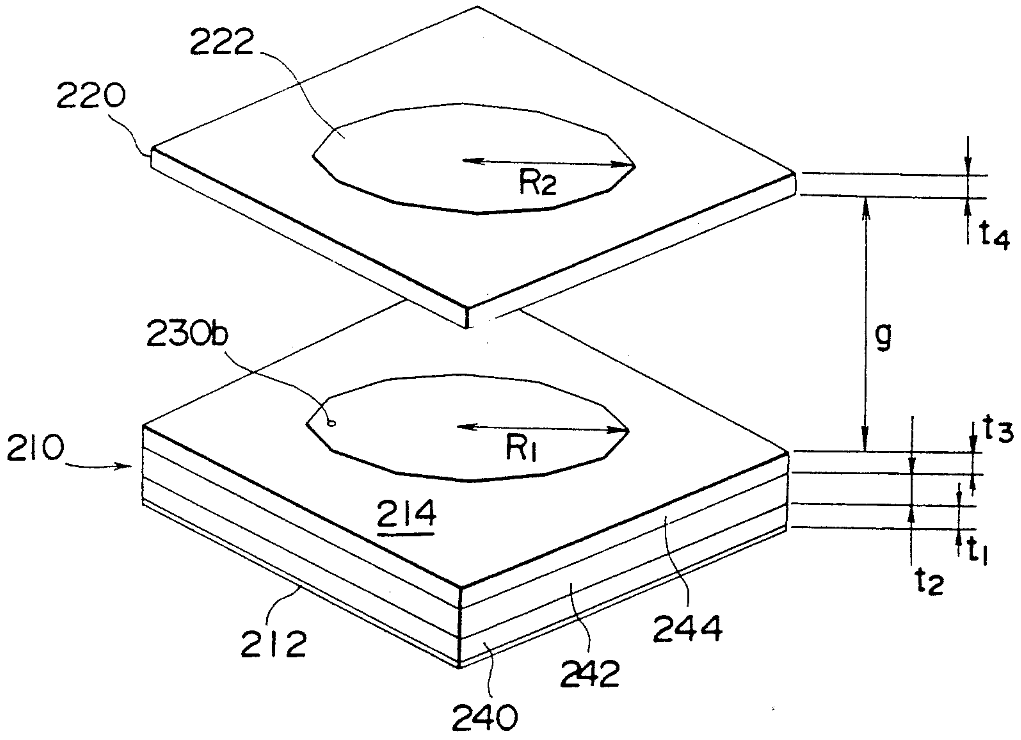
FIG. 20 is a perspective view of the schematic structure of a microstrip antenna relating to one embodiment of the present invention.
Figure 21:
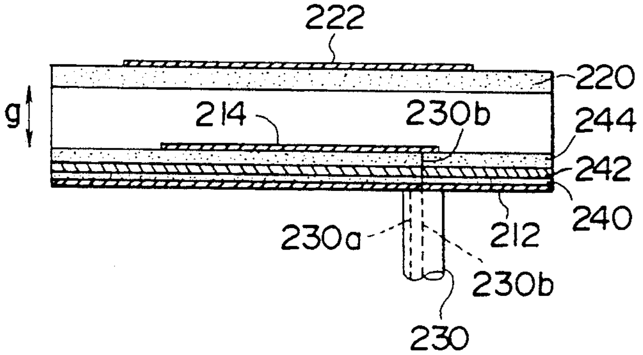
FIG. 21 is a cross-sectional view of the embodiment shown in FIG. 20.

FIG. 20 is a perspective view of the entire construction of this embodiment while FIG. 21 is a cross-sectional view of FIG. 20. The antenna element comprises a driver and driven patch elements 214, 222 and a groundplane 212 with stacked dielectric substrates. A driven patch element 222 is on a dielectric substrate 220 at a position spaced away from the feed element conductor 214 a predetermined distance. It is preferred that the gap between the driver patch element 214 and the dielectric substrate 220 is filled with any suitable means such as a foamed material having a small dielectric constant to maintain the entire strength of the antenna.

This embodiment is characterized in that three dielectric layers 240, 242 and 244 are disposed between the ground plane 212 and the driver patch element 214. By taking such a construction, there can be utilized an easily available dielectric substrate as each of the dielectric layers while providing the desired dielectric constant using three dielectric layers 240, 242 and 244. Although the illustrated dielectric between the driver patch element 214 and the ground plane 212 is of three-layer type, the number of layers to be stacked may be selected depending on the thickness, the relative dielectric constant and other factors.

This embodiment provides three-layer type since it can be manufactured more easily and can change the relative dielectric constant more broadly. It particularly determines a combination of relative dielectric constant and thickness for providing a wide band antenna, by that the relative dielectric constant and thickness ($t_1$ or $t_3$) of each of the dielectric substrates 240 and 244 are invariable while the relative dielectric constant and thickness $t_2$ of the dielectric substrate 242 is variable.

In this example, it is set that the central frequency operating the antenna is $f_0$; the wavelength is $\lambda_0$; the radius $R_1$ of the driver patch element 214 is nearly equal to 0.6 $\lambda_0$; and the radius $R_2$ of the driven patch element is nearly equal to 0.19 $\lambda_0$.

In this embodiment, parameters required to increase the frequency band width of the antenna are experimentally determined by setting that the thickness $t_1$ or $t_3$ of each of the dielectrics substrates 240 and 244 is equal to 0.0085 $\lambda_0$ and the relative dielectric constant $\epsilon_r$ is equal to 3.6 (which values are obtained, for example, from a dielectric substrate made of bis(maleimide)-triazine resin and glass fabric or a dielectric made of glass and thermosetting polyphenyl oxide) and also by varying the thickness and relative dielectric constant of the dielectric substrate 242. As a result, it has been found that the microstrip antenna of this structure can have a widened band width by stacking the dielectrics into such a configuration as shown in FIG. 20 in such a condition that the $\epsilon_r$ of the dielectric substrate 242 is equal to 2.6 (for example, Teflon) and the thickness $t_2$ thereof is equal to 0.011 $\lambda_0$. At this time, it is taken that the relative dielectric constant $\epsilon_r$ of the dielectric substrate 220 is equal to 3.6; the thickness $t_4$ thereof is equal to 0.0037 $\lambda_0$ and also that the spacing g between the driver patch 214 and the dielectric substrate 222 is equal to 0.027 $\lambda_0$.

Figure 22:
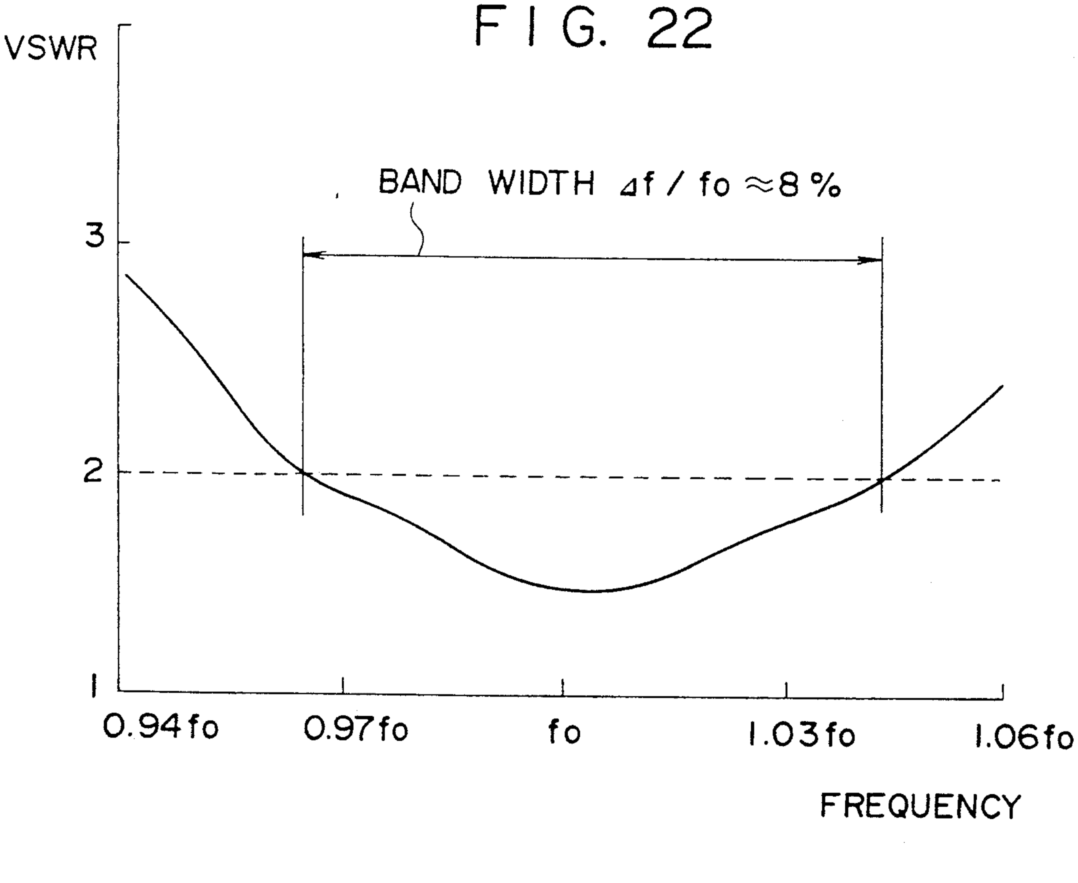
FIG. 22 is a graph showing variations of VSWR at the antenna feed point relative to frequencies in the embodiment shown in FIGS. 20 and 21.
Figure 23:
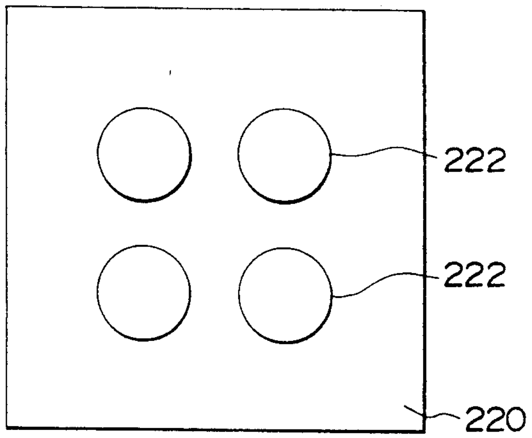
FIG. 23 is a schematic top view of an array antenna to which the principle of the microstrip antenna shown in FIGS. 20 to 22 is applied.

FIG. 22 shows VSWR (Voltage Standing Wave Ratio) for the frequency of such a microstrip antenna element. As seen from FIG. 22, this embodiment has the band width of about 8% which VSWR is smaller than the value 2.

Figure 24:
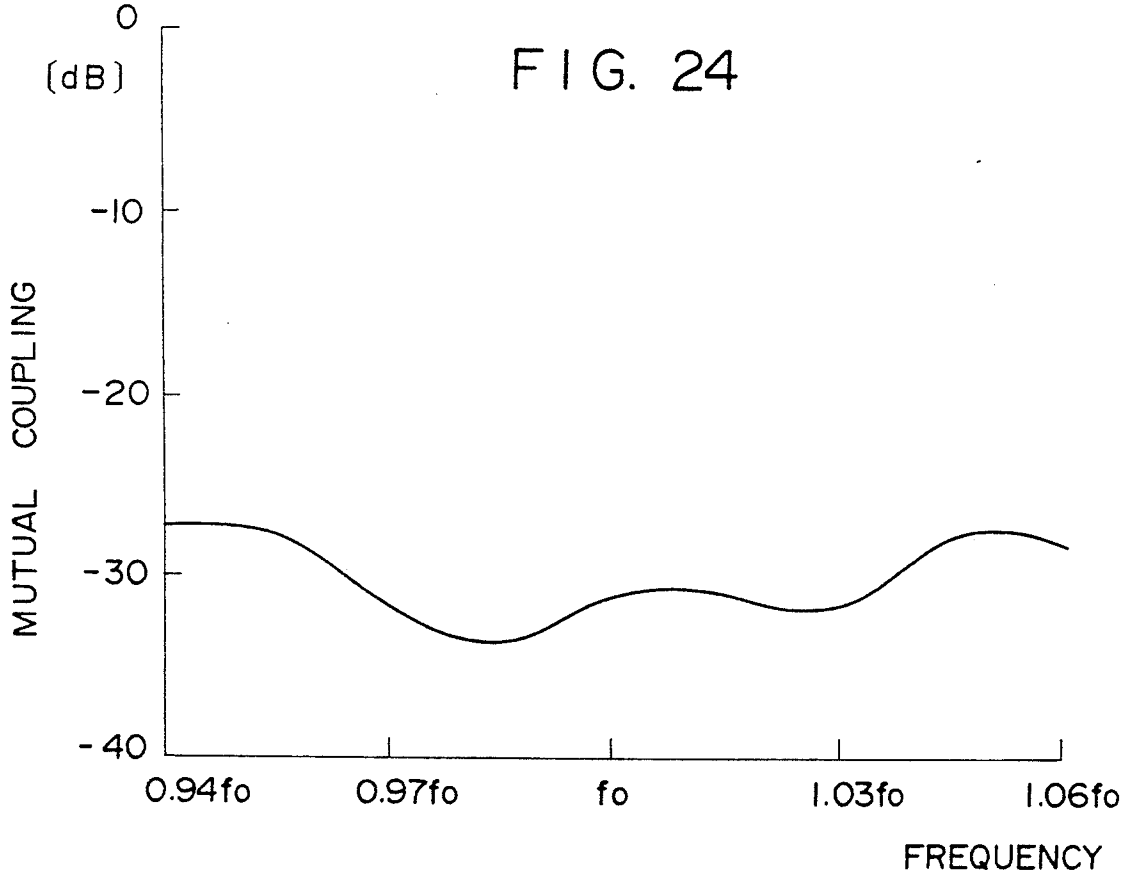
FIG. 24 is a graph showing variations of mutual coupling between antenna elements relative to frequencies when microstrip antenna elements according to the embodiment shown in FIGS. 20 to 22 are arranged in a plane.

FIG. 24 shows the characteristic of a mutual coupling between antenna elements in the array antenna. As seen from this figure, the mutual coupling is equal to about −30 dB within the frequency band ranged between 0.94 $f_0$ and 1.06 $f_0$. This means that the mutual coupling between antenna elements in the antenna system of the present invention is increased about 10 dB larger than the prior art antenna systems.

In this example, it was taken that the center-to-center spacing between each adjacent antenna elements is equal to ½ wavelength ($\lambda_0/2$).

The feed point to each of the antenna elements which are preferable for use in the phased array antenna of the present invention will be described below.

ROTATION OF FEED POINT POSITION OF ARRAY ANTENNA

Figure 25:
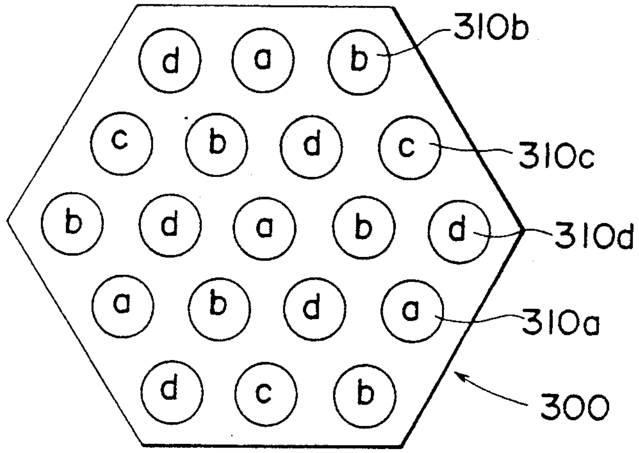
FIG. 25 illustrates the arrangement of antenna elements in the array antenna relating to the embodiment of the present invention.
Figure 26A:
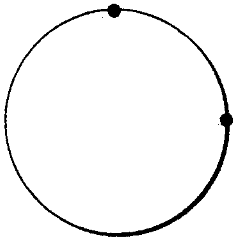
FIG. 26 illustrates the position of feed points to the antenna elements in the same embodiment.
Figure 26D:
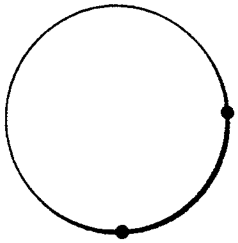
Figure 26B:
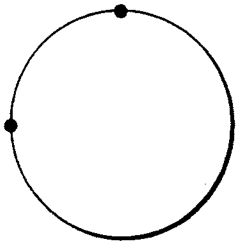
Figure 26C:
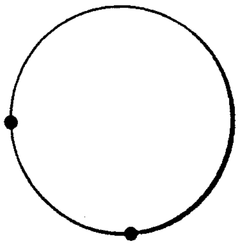

This embodiment provides a circular polarized array antenna 300 which comprises 19 microstrip antenna elements 310, as shown in FIG. 25.

The antenna elements 310 are arranged into a triangle lattice fashion, and fed as radiation patches with a circular polarization.

The circular polarization is excited by applying radio-frequency signals with the 90° phase difference to a radiating patch 316 at two feed points angularly rotated away from each other by 90° about the center thereof, through feed lines 322.

Figure 29:
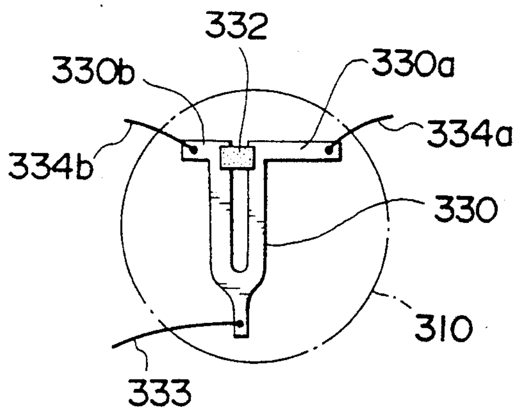
FIG. 29 illustrates a circuit for generating circular polarization.

For such a purpose, for example, a Wilkinson circuit 330 may be utilized, as shown in FIG. 29.

In this example, the Wilkinson circuit 330 is connected, at its feed end 333, with a feeding network. The Wilkinson circuit 330 includes two microstrip-line ends *330a* and *330b* having their lengths different from each other by 90°. These connecting ends *334a* and *334b* are connected with two feed points in the antenna element 310 such that the phase in the two feed points will be out of phase by 90°.

Such feeding may be similarly made with the hybrid circuit or the like.

This embodiment is characterized in that the positions of the two feed points in each of the antenna elements is rotated by some degrees against the neighbor element. More particularly, the array antenna of this embodiment has four different positions for the feed points which are different from one another by each 90°, as shown in FIG. 26. The antenna elements 310*a*–310*d* shown in FIG. 25 correspond to those shown in FIG. 26 (*a*)–(*d*), respectively. The axial ratio can be improved by arranging the antenna elements 310*a*–310*d* such that the position of two feed points in one of the antenna elements is different from that of any adjacent antenna element, as shown in FIG. 25.

Figure 27:
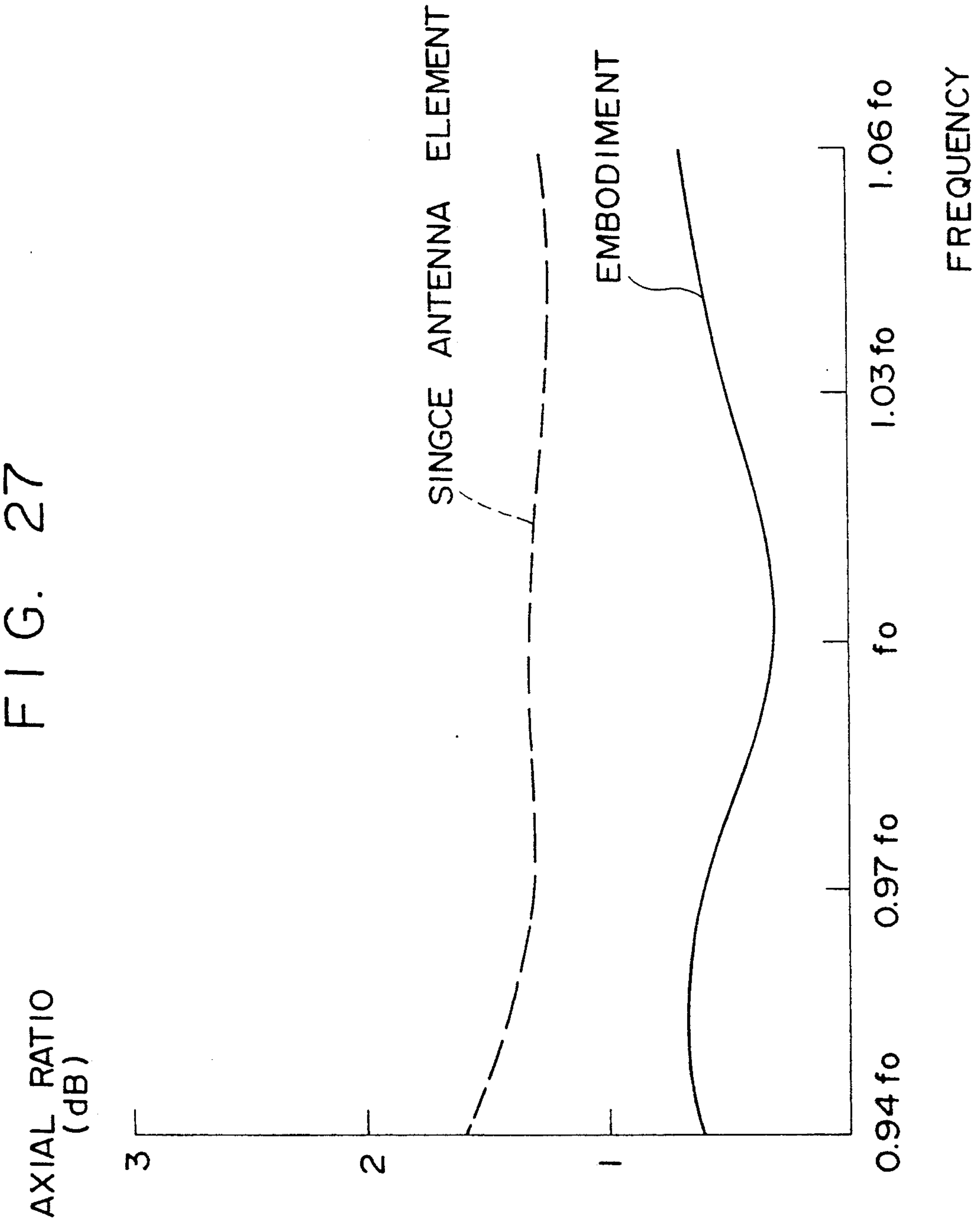
FIG. 27 is a graph showing the axial ratio of the array antenna in the same embodiment.

FIG. 27 shows the axial ratio in this embodiment. It is clear that the axial ratio is improved to be lower than 1.0 dB within a wide frequency band. It is evident that the axial ratio of the array antenna is highly improved as compared with the axial ratio of a single antenna element.

Figure 28:
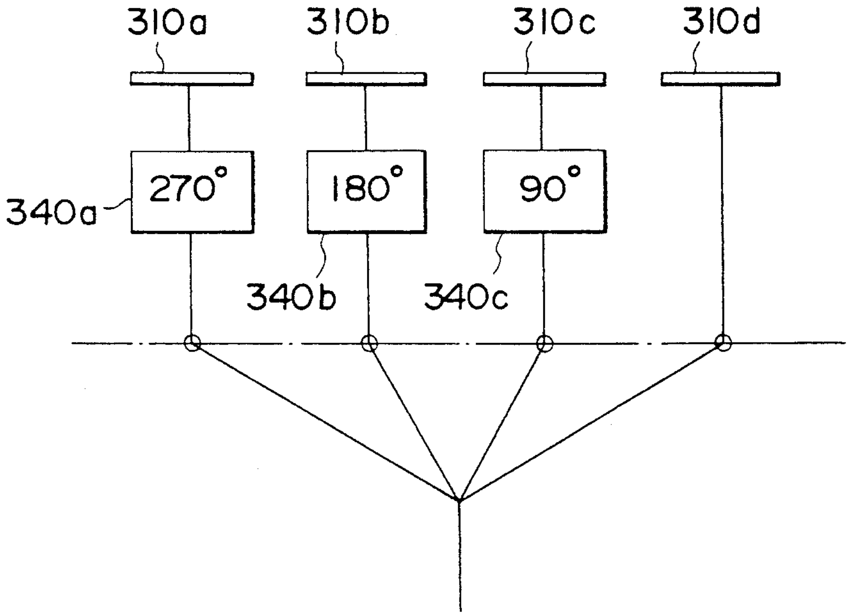
FIG. 28 illustrates a phase shift circuit for supplying power to the antenna elements.

The antenna elements should be fed the radio-frequency signals with the phase difference corresponding to the rotation of the feed positions. For example, in the case of the set of the four antenna elements as shown in FIG. 26, the antenna elements should be fed the radio-frequency signals with 0° for the element 310*d*, 90° for the element 310*c*, 180° for the element 310*b*, 270° for the element as shown in FIG. 28.

Although the above example has been described about the set of four antenna elements having feed positions rotated by each 90°, the set of three antenna elements 310*e*–310*g* can be also used.

Figure 30E:
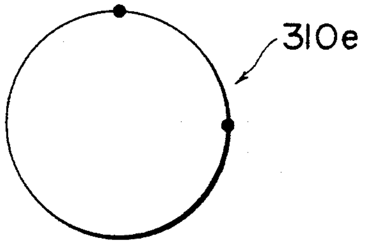
FIG. 30 illustrates the position of the feed points to antenna elements in another embodiment.
Figure 30F:
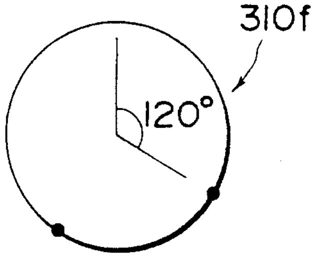
Figure 30G:
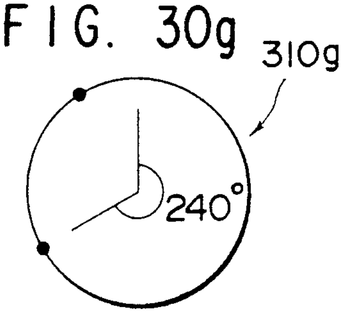
Figure 31:
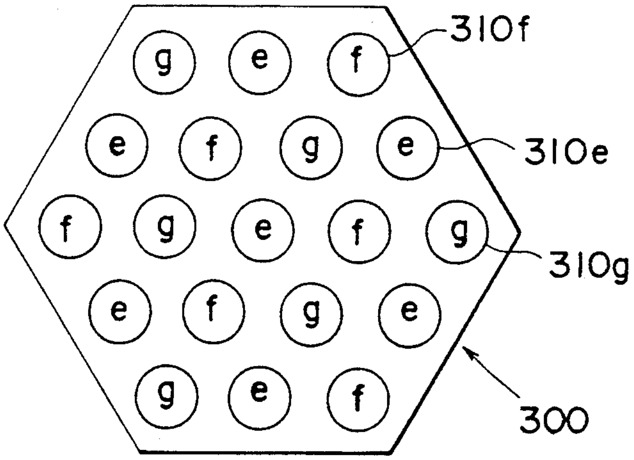
FIG. 31 illustrates the arrangement of antenna elements in still another embodiment.
Figure 32A:
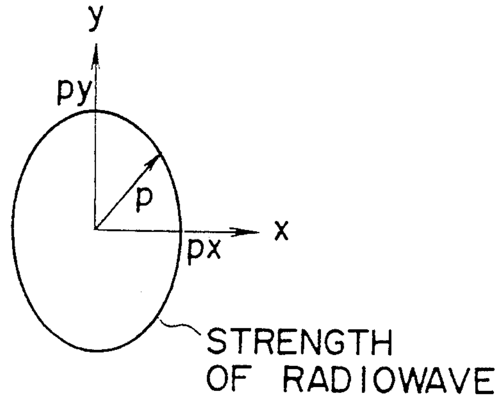
FIG. 32 illustrates the polarization of an antenna element.
Figure 32B:
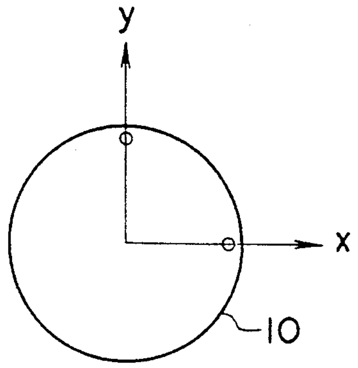
Figure 33:
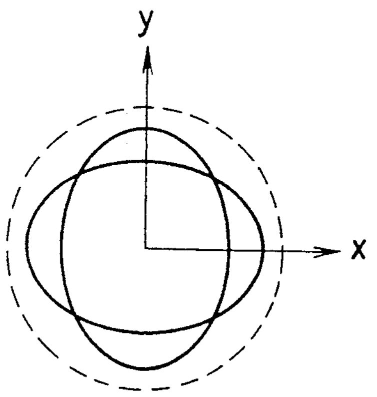
FIG. 33 illustrates the polarization of a combination of antenna elements.
Figure 34:
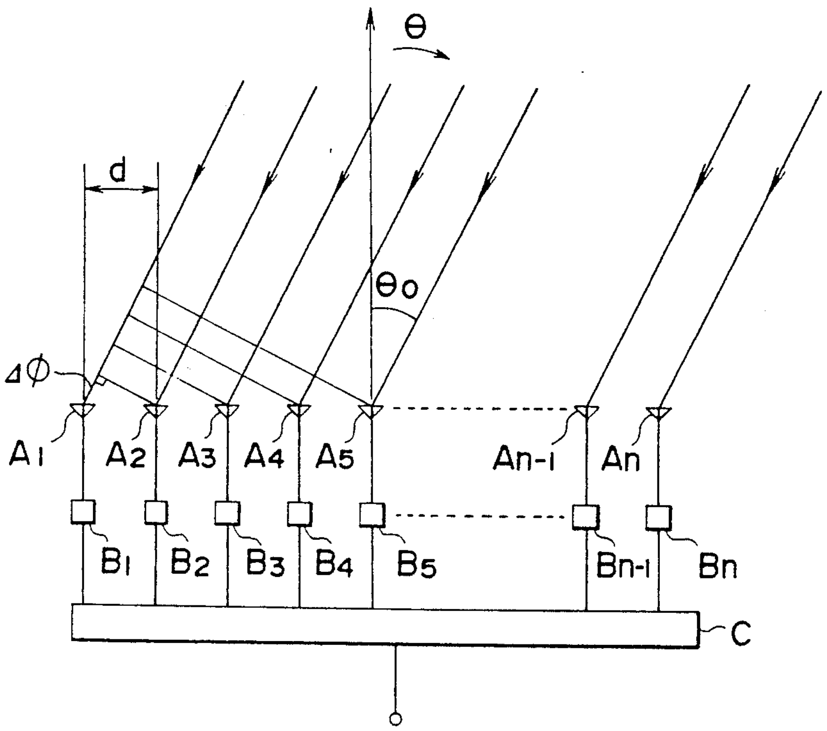
FIG. 34 illustrates the principle of the phased array antenna.
Figure 35:
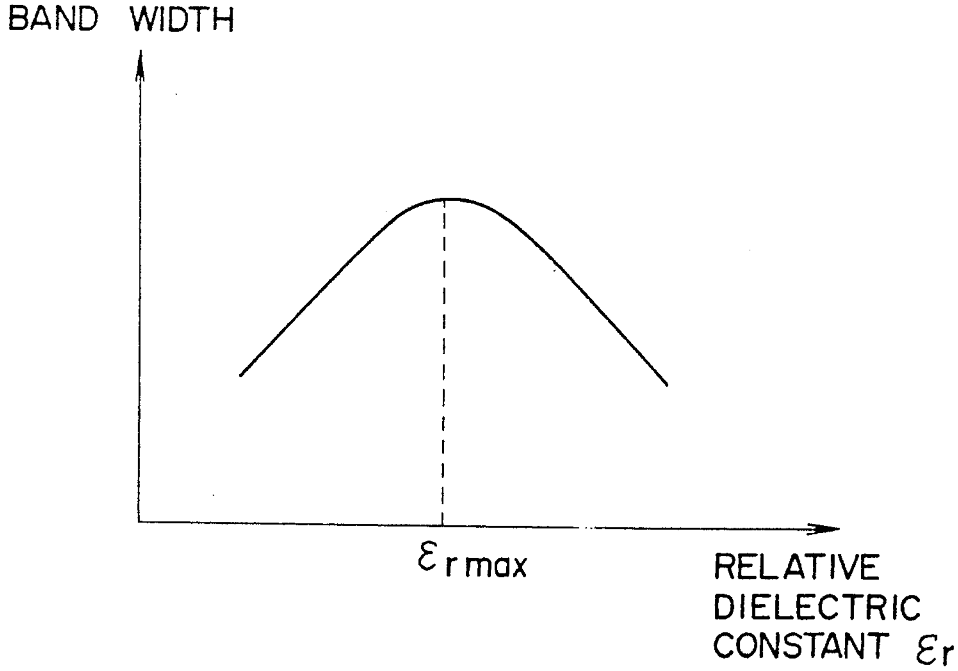
FIG. 35 is a graph showing the relationship between the relative dielectric constant and the band width.

More particularly, three antenna elements 310*e*–310*g* having feed point positions different from each other by 120° as shown in FIG. 30 are arranged as shown in FIG. 31. Thus, the feed positions in each adjacent antenna elements 310 can be set to be different from each other. Similarly, this can improve the axial ratio in the entire antenna system.

If five or more feed point positions are arranged, the axial ratio can be correspondingly improved. However, it becomes difficult to regulate the position of feed points, and the phase shift circuits are more complicated. It is thus believed that it is not practical to utilize five or more feed point positions.

We claim:

1. A mobile antenna system comprising:

a turn detecting section for detecting the state of turn in a mobile;

an antenna controllable with respect to its beam direction;

a receiving section for taking a signal proportional to the strength of a radiowave received by said antenna; and a beam direction control section for changing the beam direction according to the turning angle of the mobile detected by said turn detecting section and also the strength of the radiowave received by said receiving section;

a satellite direction searching section for controlling the beam direction of said antenna over a broad range to obtain a higher strength in said received radiowave and to find the satellite direction; and a control selecting section for selecting one of a plurality of control modes depending on said strength of received radiowave and said state of turn;

said control modes selected by said control selecting section being at least three types:

(a) an on-nonturning control selected when it is judged that the mobile is moving straight and adapted to change the beam direction of the antenna slightly so as to detect the direction of the highest strength of received radiowave;

(b) an on-turning control selected when it is judged that the mobile is turning and adapted to change the beam direction of the antenna depending on the state of turn and also to select the direction of the highest strength of received radiowave; and (c) an on-blocking control selected when said received radiowave is blocked and is adapted to change the beam direction of the antenna depending on the state of turning.

2. A mobile antenna system as defined in claim 1 wherein said turn detecting section includes an angular rate sensor for sensing the turning angle of the mobile.

3. A mobile antenna system as defined in claim 1 wherein said antenna is a phased array antenna.

4. A mobile antenna system as defined in claim 3 wherein each of said radiating patch elements in said antenna layer includes two feed points with 90° difference in angle about the center thereof, the positions of two feed points rotated about the center thereof such that each of said radiating patch elements is excited in a circular polarization mode and wherein said radiating patch elements are arranged into a regular triangle lattice in three directions and have the set of three positions of feed points angularly different from one another by 120 degrees, the position of feed points in one of said radiating patch elements being different from that of any adjacent radiating patch element, wherein the axial ratio is improved and the mutual coupling between said radiating patch elements is reduced due to the equal distribution of the three feed positions.

5. A phased array antenna as defined in claim 4 wherein each of said radiating patch elements in said antenna layer includes two feed points with 90° difference in angle about the center thereof, the position of two feed points rotated about the center thereof, such that each of said radiating patch elements is excited in a circular polarization mode and wherein said radiating patch elements are arranged into a regular triangle lattice in three directions and have the set of four positions of feed points angularly different from one another by 90 degrees, the position of feed points in one of said radiating patch elements being different from that of any adjacent radiating patch element.

6. A mobile antenna system as defined in claim 3 wherein said phased array antenna has a plurality of microstrip antenna elements, each of said microstrip antenna elements comprising:

a ground plane;

a driver patch element disposed opposed to said ground plane through a dielectric substrate; and a driven patch element disposed spaced away from said driver patch element, said dielectric substrate being formed by stacking two or more dielectrics having dielectric constants which are different from one another.

7. A microstrip antenna element as defined in claim 6 wherein said dielectric stack is of three-layer structure.

8. A microstrip antenna element as defined in claim 7 wherein the two upper and lower layers in said three-layer dielectric stack are made of a dielectric substrate having the same dielectric constant and the intermediate layer is made of a dielectric substrate having a dielectric constant different from that of said upper and lower layers.

9. A mobile antenna system as defined in claim 3, wherein said phased array antenna comprises:

an antenna element layer including a plurality of radiating elements which are formed on a ground plane through a first dielectric substrate;

a feeding network layer including a feeding network which consists of phase shifters and power dividers, these components being made of microstripline which are respectively connected with said plurality of radiating elements and disposed on a second dielectric substrate; and a drive circuit layer including a drive circuit which is connected with said phase shifters in said feeding network and adapted to supply a signal for controlling said phase shifters, wherein said antenna element, feeding network and drive circuit layers being stacked on above another, and said antenna element layer and feeding network layer are shared by a common ground plane so that said antenna element layer and said feeding network layer are formed on said common ground plane at the opposite sides thereof, and said feeding network layer is opposed to said drive circuit layer so that said feeding network and drive circuit layers are connected to each other through detachable connectors.

10. A mobile antenna system as defined in claim 9, wherein each of the phase shifters in said feeding network layer is made of a plurality of microstriplines different in length from one another, said microstriplines being selected to change the value of phase shift by switching means.

11. A mobile antenna system as defined in claim 10, wherein the power dividers in said feeding network layer are made of microstripline, the phase shifters and power dividers in said feeding network layer are formed by striplines on the dielectric substrate between the ground plane on the side of the antenna layer and the ground plane on the side of the drive circuit layer, and said drive circuit layer includes drive circuits formed on the substrate which is fixedly mounted on the ground plane on the side of the drive circuit layer.

12. A mobile antenna system as defined in claim 6, wherein said dielectric substrate is formed by stacking three dielectric layers having dielectric constants $Er_1$, $Er_2$, $Er_3$, respectively, such that the resultant dielectric constant of said dielectric substrate is given by $$Er=(t_1+t_2+t_3)/(t_1/Er_1+t_2/Er_2+t_3/Er_3).$$

where Er is the resultant dielectric constant and $t_1$, $t_2$, $t_3$ are the thickness of the three dielectric layers, respectively.

* * * * *